United States Patent
Meng et al.

(10) Patent No.: US 10,728,718 B2
(45) Date of Patent: Jul. 28, 2020

(54) INCOMING CALL PROCESSING METHOD, USER EQUIPMENT, AND STORAGE MEDIUM

(71) Applicant: HUAWEI TECHNOLOGIES CO., LTD., Shenzhen, Guangdong (CN)

(72) Inventors: Chao Meng, Shanghai (CN); Yinyuan Jia, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 110 days.

(21) Appl. No.: 16/090,040

(22) PCT Filed: Mar. 28, 2016

(86) PCT No.: PCT/CN2016/077588
§ 371 (c)(1),
(2) Date: Sep. 28, 2018

(87) PCT Pub. No.: WO2017/166034
PCT Pub. Date: Oct. 5, 2017

(65) Prior Publication Data
US 2019/0058972 A1   Feb. 21, 2019

(51) Int. Cl.
*H04W 4/00* (2018.01)
*H04W 4/12* (2009.01)
(Continued)

(52) U.S. Cl.
CPC ............. *H04W 4/12* (2013.01); *H04L 5/0055* (2013.01); *H04L 65/1006* (2013.01);
(Continued)

(58) Field of Classification Search
None
See application file for complete search history.

(56) References Cited

U.S. PATENT DOCUMENTS

2002/0099776 A1 *  7/2002  Cafarella .......... H04L 29/06027
                                                            709/206
2003/0174825 A1 *  9/2003  Aldridge .................. H04Q 3/66
                                                            379/207.15
(Continued)

FOREIGN PATENT DOCUMENTS

CN       104320550 A      1/2015
CN       104507062 A      4/2015
(Continued)

OTHER PUBLICATIONS

Extended European Search Report issued in European Application No. 16895815.5 dated Feb. 14, 2019, 9 pages.
(Continued)

*Primary Examiner* — Gerald A Smarth
(74) *Attorney, Agent, or Firm* — Fish & Richardson P.C.

(57) ABSTRACT

The present disclosure relates to example incoming call processing methods and devices. In one example method, a call request message is received by a terminal device from a core network. MT signaling interaction is performed by the terminal device with the core network based on the call request message. A determination is made, by the terminal device, on whether the MT signaling interaction succeeds within a preset duration. Prompt information is sent responsive to a determination that the MT signaling interaction fails within the preset duration.

20 Claims, 11 Drawing Sheets

(51) Int. Cl.
*H04L 29/06* (2006.01)
*H04L 5/00* (2006.01)
*H04W 88/02* (2009.01)

(52) U.S. Cl.
CPC .......... *H04L 65/1069* (2013.01); *H04L 65/80* (2013.01); *H04W 88/023* (2013.01)

(56) References Cited

U.S. PATENT DOCUMENTS

| | | | | |
|---|---|---|---|---|
| 2004/0147258 A1* | 7/2004 | Dokko | ............... | H04M 3/42212 455/428 |
| 2006/0116110 A1* | 6/2006 | Chen | .................... | H04W 68/00 455/412.2 |
| 2008/0014933 A1* | 1/2008 | Montz | .................... | H04W 8/08 455/433 |
| 2012/0064884 A1 | 3/2012 | Ramachandran et al. | | |
| 2015/0257178 A1 | 9/2015 | Huang-Fu et al. | | |

FOREIGN PATENT DOCUMENTS

| | | |
|---|---|---|
| CN | 104660811 A | 5/2015 |
| CN | 105407543 A | 3/2016 |

OTHER PUBLICATIONS

3GPP TS 23128 V13.4.0 (Sep. 2015), 3rd Generation Partnership Project;Technical Specification Group Services and System Aspects;IP Multimedia Subsystem (IMS);Stage 2(Release 13), Dec. 2015. total 314 pages.

International Search Report and Written Opinion issued in International Application No. PCT/CN2016/077588 dated Jan. 3, 2017, 20 pages.

\* cited by examiner

INCOMING CALL PROCESSING METHOD, USER EQUIPMENT, AND STORAGE MEDIUM

CROSS-REFERENCE TO RELATED APPLICATIONS

This application is a National Stage of International Application No. PCT/CN2016/077588, filed on Mar. 28, 2016, which is hereby incorporated by reference in its entirety.

TECHNICAL FIELD

Embodiments of the present disclosure relate to communications technologies, and in particular, to an incoming call processing method, user equipment, and a storage medium.

BACKGROUND

A Voice over Long Term Evolution (Voice over Long Term Evolution, VoLTE) solution is an Internet protocol (Internet Protocol, IP for short) data transmission technology. An LTE system may implement a data service and a voice service by using the technology. To be specific, a same network may be used for the voice service and the data service, thereby improving call quality of the voice service.

Currently, during a VoLTE voice call, when calling UE calls called UE by using a core network device, the called UE needs to complete mobile terminated (Mobile Terminated, MT for short) signaling interaction with the core network device. The called UE rings only after the called UE and the core network device complete the MT signaling interaction.

However, in the prior art, the called UE does not ring if the MT signaling interaction between the called UE and the core network device fails, resulting in that a called user cannot notice a current incoming call of the calling UE, and man-machine interaction is not intelligent enough.

SUMMARY

Embodiments of the present disclosure provide an incoming call processing method, user equipment, and a storage medium, to resolve a technical problem in the prior art that called UE does not ring if MT signaling interaction between the called UE and a core network device fails, resulting in that a called user cannot notice a current incoming call of calling UE, and man-machine interaction is not intelligent enough.

According to a first aspect, an embodiment of the present disclosure provides an incoming call processing method. The method may include: receiving, by a called user equipment UE, a call request message sent by a core network device, and performing MT signaling interaction with the core network device based on the call request message, where the call request message includes a phone number of calling UE; determining, by the called UE, whether the MT signaling interaction succeeds within preset duration; sending, by the called UE, prompt information to a called user based on the phone number of the calling UE when the called UE determines that the MT signaling interaction fails within the preset duration, where the prompt information is used to indicate to the called user that an incoming call of the calling UE fails to be answered.

By using the incoming call processing method provided in the first aspect, after receiving the call request message sent by the core network device, the called UE may determine whether the MT signaling interaction between the called UE and the core network device succeeds, and may send the prompt information to the called user in time when determining that the MT signaling interaction fails. In this way, the called user may notice a current incoming call of the calling UE based on the prompt information, thereby making man-machine interaction more intelligent, and at the same time improving experience of the called user.

Optionally, in a possible implementation of the first aspect, the sending, by the called UE, prompt information to a called user based on the phone number of the calling UE specifically includes: displaying, by the called UE, a missed incoming call notification in a user interface based on the phone number of the calling UE.

Further, in a possible implementation of the first aspect, the determining, by the called UE, whether the MT signaling interaction succeeds within preset duration specifically includes: determining, by the called UE, that the MT signaling interaction fails when the called UE determines that a ring notification message is not sent to the core network device within the preset duration, where the ring notification message is used to instruct the core network device to send a ring back tone to the calling UE; or determining, by the called UE, that the MT signaling interaction fails when the called UE determines that a hang-up notification message sent by the core network device is received within the preset duration, where the hang-up notification message is used to instruct the called UE to interrupt the MT signaling interaction with the core network device.

By using the incoming call processing method provided in the possible implementation, when determining that the MT signaling interaction between the called UE and the core network device fails, the called UE may send the prompt information to the called user in time. In this way, the called user may notice the current incoming call of the calling UE based on the prompt information, thereby making man-machine interaction more intelligent, and at the same time improving experience of the called user.

Optionally, in a possible implementation of the first aspect, the preset duration includes first duration and second duration, and the determining, by the called UE, that the MT signaling interaction fails when the called UE determines that a hang-up notification message sent by the core network device is received within the preset duration specifically includes: determining, by the called UE, that the MT signaling interaction fails when the called UE determines that the hang-up notification message is received within the first duration and the call request message is not received again within the second duration; or determining, by the called UE, that the MT signaling interaction fails when the called UE determines that the hang-up notification message is received within the first duration and the ring notification message is not sent to the core network device when the MT signaling interaction is performed again with the core network device within the second duration; or determining, by the called UE, that the MT signaling interaction fails when the called UE determines that the ring notification message is not sent to the core network device within the first duration and the hang-up notification message is received within the second duration.

By using the incoming call processing method provided in the possible implementation, by presetting the first duration and the second duration, accuracy of determining, by the called UE, that the MT signaling interaction between the called UE and the core network device fails can be improved, so that accuracy of sending, by the called UE, the prompt information to the called user is improved.

Optionally, in a possible implementation of the first aspect, the preset duration includes first duration and second duration, and the determining, by the called UE, whether the MT signaling interaction succeeds within preset duration specifically includes: determining, by the called UE, that the MT signaling interaction succeeds when the called UE determines that a ring notification message is sent to the core network device within the first duration; or determining, by the called UE, that the MT signaling interaction succeeds when the called UE determines that a hang-up notification message sent by the core network device is received within the first duration and a ring notification message is sent to the core network device when the MT signaling interaction is performed again with the core network device within the second duration; or determining, by the called UE, that the MT signaling interaction succeeds when the called UE determines that a ring notification message is not sent to the core network device within the first duration and the ring notification message is sent to the core network device within the second duration.

By using the incoming call processing method provided in the possible implementation, when determining that the MT signaling interaction between the called UE and the core network device succeeds, the called UE does not send the prompt information to the called user, thereby saving signaling overheads, and reducing power consumption of the called UE.

Optionally, in a possible implementation of the first aspect, the preset duration includes first duration and second duration, and after the determining, by the called UE, whether the MT signaling interaction succeeds within preset duration, the method further includes: recording, by the called UE, consumed duration of the MT signaling interaction when the called UE determines that the MT signaling interaction succeeds within the preset duration.

By using the incoming call processing method provided in the possible implementation, the called UE may record actual consumed duration of the MT signaling interaction between the called UE and the core network device, that is, actual consumed duration from receiving the call request message sent by the core network device to sending the ring notification message to the core network device. In this way, the called user may adjust the first duration based on the actual consumed duration measured by the called UE, or, the called UE adaptively adjusts the first duration based on the actual consumed duration, to ensure accuracy of the specified first duration, to further ensure accuracy of determining, by the called UE by using the first duration and the second duration, whether the MT signaling interaction succeeds.

According to a second aspect, an embodiment of the present disclosure provides user equipment UE. The UE includes: a receiving module, configured to receive a call request message sent by a core network device, where the call request message includes a phone number of calling UE; an interaction module, configured to perform MT signaling interaction with the core network device based on the call request message received by the receiving module; a determining module, configured to determine whether the MT signaling interaction succeeds within preset duration; and an output module, configured to send prompt information to a called user based on the phone number of the calling UE when the determining module determines that the MT signaling interaction fails within the preset duration, where the prompt information is used to indicate to the called user that an incoming call of the calling UE fails to be answered.

Optionally, in a possible implementation of the second aspect, the output module is specifically configured to display a missed incoming call notification in a user interface based on the phone number of the calling UE.

Further, in a possible implementation of the second aspect, the determining module is specifically configured to determine that the MT signaling interaction fails when determining that a ring notification message is not sent by the interaction module to the core network device within the preset duration, where the ring notification message is used to instruct the core network device to send a ring back tone to the calling UE; or the determining module is specifically configured to determine that the MT signaling interaction fails when determining that the interaction module receives, within the preset duration, a hang-up notification message sent by the core network device, where the hang-up notification message is used to instruct the interaction module to interrupt the MT signaling interaction with the core network device.

Optionally, in a possible implementation of the second aspect, the preset duration includes first duration and second duration, and that the determining module is configured to determine that the MT signaling interaction fails when determining that the interaction module receives, within the preset duration, a hang-up notification message sent by the core network device is specifically: the determining module is specifically configured to determine that the MT signaling interaction fails when determining that the interaction module receives the hang-up notification message within the first duration and does not receive the call request message again within the second duration; or the determining module is specifically configured to determine that the MT signaling interaction fails when determining that the interaction module receives the hang-up notification message within the first duration and does not send the ring notification message to the core network device when the MT signaling interaction is performed again with the core network device within the second duration; or the determining module is specifically configured to determine that the MT signaling interaction fails when determining that the interaction module does not send the ring notification message to the core network device within the first duration and receives the hang-up notification message within the second duration.

Optionally, in a possible implementation of the second aspect, the preset duration includes first duration and second duration; and the determining module is specifically configured to determine that the MT signaling interaction succeeds when determining that the interaction module sends a ring notification message to the core network device within the first duration; or the determining module is specifically configured to determine that the MT signaling interaction succeeds when determining that the interaction module receives, within the first duration, a hang-up notification message sent by the core network device and sends a ring notification message to the core network device when the MT signaling interaction is performed again with the core network device within the second duration; or the determining module is specifically configured to determine that the MT signaling interaction succeeds when determining that the interaction module does not send a ring notification message to the core network device within the first duration and sends the ring notification message to the core network device within the second duration.

Optionally, in a possible implementation of the second aspect, the preset duration includes first duration and second duration, and the UE further includes: a recording module, further configured to record consumed duration of the MT signaling interaction when the determining module determines that the MT signaling interaction succeeds within the preset duration.

For beneficial effects of the UE provided in the foregoing second aspect and the possible implementations of the second aspect, refer to the beneficial effects produced by the foregoing first aspect and the possible implementations of the first aspect. Details are not described herein again.

According to a third aspect, an embodiment of the present disclosure provides user equipment UE. The UE includes: a transceiver, configured to receive a call request message sent by a core network device, where the call request message includes a phone number of calling UE; a processor, configured to: perform, by using the transceiver, MT signaling interaction with the core network device based on the call request message received by the receiver, and determine whether the MT signaling interaction succeeds within preset duration; and an output device, configured to send prompt information to a called user based on the phone number of the calling UE when the processor determines that the MT signaling interaction fails within the preset duration, where the prompt information is used to indicate to the called user that an incoming call of the calling UE fails to be answered.

Optionally, in a possible implementation of the third aspect, the output device is specifically configured to display a missed incoming call notification in a user interface based on the phone number of the calling UE.

Further, in a possible implementation of the third aspect, the processor is specifically configured to determine that the MT signaling interaction fails when determining that a ring notification message is not sent to the core network device within the preset duration by using the transceiver, where the ring notification message is used to instruct the core network device to send a ring back tone to the calling UE; or the processor is specifically configured to determine that the MT signaling interaction fails when determining that a hang-up notification message sent by the core network device is received within the preset duration by using the transceiver, where the hang-up notification message is used to instruct the processor to interrupt the MT signaling interaction with the core network device.

Optionally, in a possible implementation of the third aspect, the preset duration includes first duration and second duration, and that the processor is configured to determine that the MT signaling interaction fails when determining that a hang-up notification message sent by the core network device is received within the preset duration by using the transceiver is specifically: the processor is specifically configured to determine that the MT signaling interaction fails when determining that the hang-up notification message is received within the first duration by using the transceiver and the call request message is not received again within the second duration by using the transceiver; or the processor is specifically configured to determine that the MT signaling interaction fails when determining that the hang-up notification message is received within the first duration by using the transceiver and the ring notification message is not sent to the core network device by using the transceiver when the MT signaling interaction is performed again with the core network device within the second duration by using the transceiver; or the processor is specifically configured to determine that the MT signaling interaction fails when determining that the ring notification message is not sent to the core network device within the first duration by using the transceiver and the hang-up notification message is received within the second duration by using the transceiver.

Optionally, in a possible implementation of the third aspect, the preset duration includes first duration and second duration; and the processor is specifically configured to determine that the MT signaling interaction succeeds when determining that a ring notification message is sent to the core network device within the first duration by using the transceiver; or the processor is specifically configured to determine that the MT signaling interaction succeeds when determining that a hang-up notification message sent by the core network device is received within the first duration by using the transceiver and a ring notification message is sent to the core network device by using the transceiver when the MT signaling interaction is performed again with the core network device within the second duration by using the transceiver; or the processor is specifically configured to determine that the MT signaling interaction succeeds when determining that a ring notification message is not sent to the core network device within the first duration by using the transceiver and the ring notification message is sent to the core network device within the second duration by using the transceiver.

Optionally, in a possible implementation of the third aspect, the preset duration includes first duration and second duration; and the processor is further configured to instruct the memory to record consumed duration of the MT signaling interaction when determining that the MT signaling interaction succeeds within the preset duration.

For beneficial effects of the UE provided in the foregoing third aspect and the possible implementations of the third aspect, refer to the beneficial effects produced by the foregoing first aspect and the possible implementations of the first aspect. Details are not described herein again.

With reference to the foregoing first aspect and the possible implementations of the first aspect, the second aspect and the possible implementations of the second aspect, the third aspect and the possible implementations of the third aspect, the hang-up notification message is a Session Initiation Protocol SIP exception message or a call disconnection message.

According to a fourth aspect, an embodiment of the present disclosure provides a non-volatile computer-readable storage medium storing one or more programs. The one or more programs include an instruction. The instruction enables, when being executed by an electronic device having a processor, a transceiver, and an output device, the electronic device to perform the following events: receiving a call request message sent by a core network device, and performing MT signaling interaction with the core network device based on the call request message, where the call request message includes a phone number of calling UE; determining whether the MT signaling interaction succeeds within preset duration; and sending prompt information based on the phone number of the calling UE when determining that the MT signaling interaction fails within the preset duration, where the prompt information is used to indicate that an incoming call of the calling UE fails to be answered.

For the incoming call processing method, the user equipment, and the storage medium provided in the embodiments of the present disclosure, after receiving the call request message sent by the core network device, the called UE may determine whether the MT signaling interaction between the called UE and the core network device succeeds, and may send the prompt information to the called user in time when determining that the MT signaling interaction fails. In this way, the called user may notice a current incoming call of the calling UE based on the prompt information, thereby making man-machine interaction more intelligent, and at the same time improving experience of the called user.

BRIEF DESCRIPTION OF DRAWINGS

To describe the technical solutions more clearly, the following briefly describes the accompanying drawings describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

Figure 1:
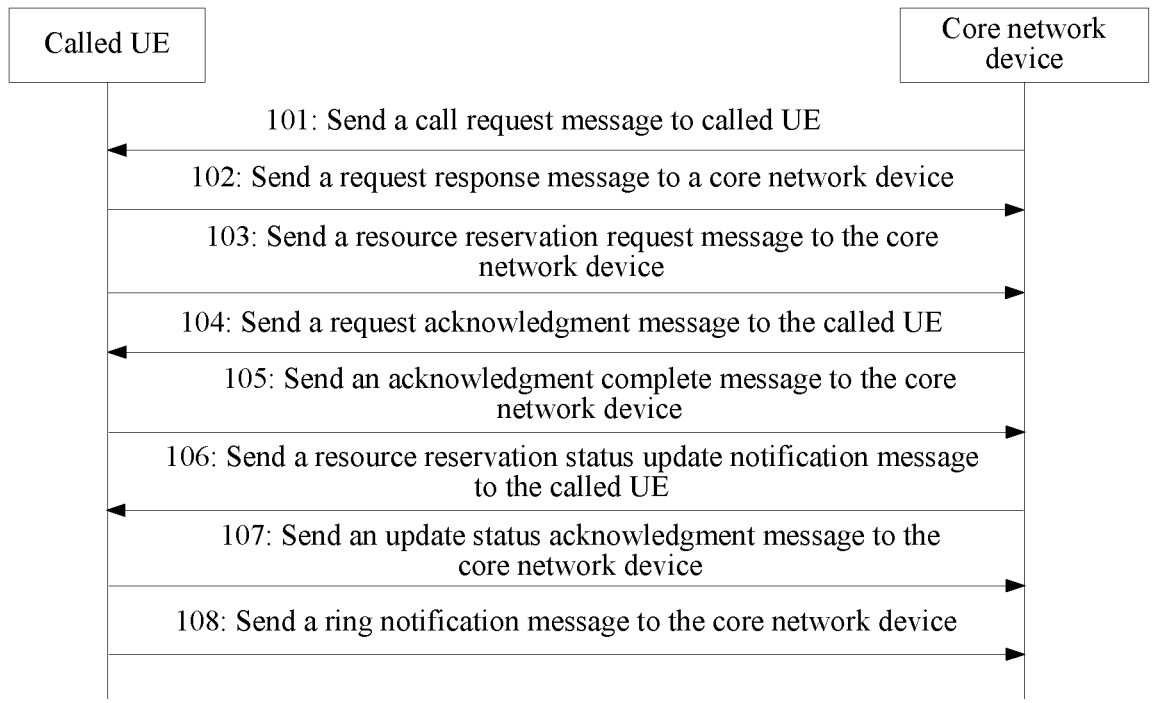
FIG. 1 is a flowchart of MT signaling interaction with a precondition in an existing LTE system according to an embodiment of the present disclosure.

To make the objectives, technical solutions, and advantages of some embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

User equipment UE mentioned in the embodiments of the present disclosure may be a wireless terminal such as a mobile phone or a tablet computer. The wireless terminal includes a device that provides a user with a voice and/or data service. Optionally, the device may be a handheld device with a radio connection function, or another processing device connected to a wireless modem. In addition, the wireless terminal may further communicate with one or more core networks through a radio access network (such as a RAN, Radio Access Network). For example, the wireless terminal may be specifically a mobile terminal, such as a mobile phone (also referred to as a "cellular" phone) and a computer with a mobile terminal, and the computer with a mobile terminal may be a portable, pocket-sized, handheld, computer built-in, or in-vehicle mobile apparatus, which can exchange voice and/or data with the core network.

A core network device used in the embodiments of the present disclosure may be a Proxy-Call Session Control Function (Proxy-Call Session Control Function, P-CSCF for short) in an LTE system or may further be a Serving GPRS Support Node (Serving GPRS Support Node, SGSN for short) or a mobile switching center (Mobile Switching Center, MSC for short) in a UMTS system.

An incoming call processing method provided in the embodiments of the present disclosure may be applicable to called UE in a 4G core network, called UE in a 3G core network, or the like. The called UE discussed herein is UE that performs mobile terminated (Mobile Terminated) signaling interaction with the core network device after receiving a call request of calling UE forwarded by the core network device. It should be noted that when the called UE is a UE in the 4G core network, the MT signaling interaction performed by the called UE and the core network device may include: MT signaling interaction without resource reservation (a precondition) and MT signaling interaction with a precondition. Which type of MT signaling interaction is specifically used is related to whether the core network device and the called UE support a precondition. Certainly, the incoming call processing method used in the embodiments of the present disclosure includes, but is not limited to, the foregoing application scenario. The incoming call processing method provided in the embodiments of the present disclosure may be used in all scenarios in which called UE is used.

To make the embodiments of the present disclosure more comprehensible, a 4G core network is used as an example below to describe a procedure of normal MT signaling interaction between called UE and a core network device.

FIG. 1 is a flowchart of MT signaling interaction with a precondition in an existing LTE system according to an embodiment of the present disclosure. As shown in FIG. 1, the MT signaling interaction with a precondition may include the following steps.

S101: A core network device sends a call request message to called UE.

The call request message may be a call request message forwarded by calling UE to the called UE by using the core network device. The call request message carries a phone number of the calling UE. Optionally, the call request message may further include a time of initiating a call by the calling UE, or the like.

S102: The called UE sends a request response message to the core network device.

The request response message is used to indicate to the core network device that the called UE has received the call request message sent by the core network device.

S103: The called UE sends a resource reservation request message to the core network device.

The resource reservation request message is used to request the core network device to reserve, for the called UE, a resource for transmitting voice service data.

S104: The core network device sends a request acknowledgment message to the called UE.

The request acknowledgment message is used to indicate to the called UE that the core network device has received the resource reservation request message sent by the called UE.

S105: The called UE sends an acknowledgment complete message to the core network device.

The acknowledgment complete message is used to indicate to the core network device that the called UE has received the request acknowledgment message sent by the core network device.

S106: The core network device sends a resource reservation status update notification message to the called UE.

The resource reservation status update notification message is used to indicate to the called UE that the calling UE has completed reservation of the resource. In addition, it should be noted that the resource reserved for the called UE by the core network device based on the resource reservation request message may be notified to the called UE by using another message, for example, a non-access stratum message.

S107: The called UE sends an update status acknowledgment message to the core network device.

The update status acknowledgment message is used to indicate to the core network device that the called UE has received the resource reservation status update notification message sent by the core network device.

S108: The called UE sends a ring notification message to the core network device.

The ring notification message is used to indicate to the core network device that the called UE is ready to start ringing, and at the same time instruct the core network device to send a ring back tone to the calling UE. At this point, the called UE and a 4G core network device have completed the MT signaling interaction with a precondition. The calling UE has successfully called the called UE.

Figure 2:
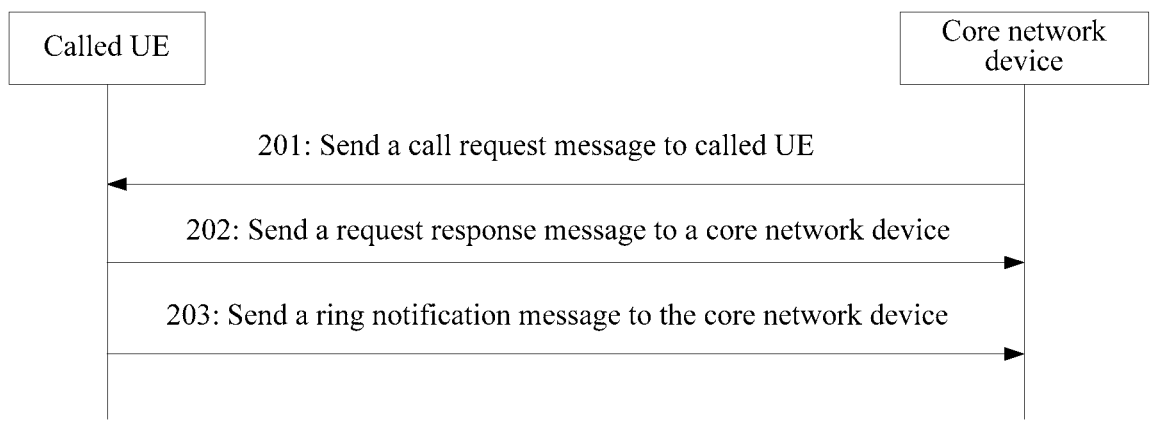
FIG. 2 is a flowchart of MT signaling interaction without a precondition in an existing LTE system according to an embodiment of the present disclosure.

FIG. 2 is a flowchart of MT signaling interaction without a precondition in an existing LTE system according to an embodiment of the present disclosure. As shown in FIG. 2, the MT signaling interaction without a precondition may include the following steps:

S201: A core network device sends a call request message to called UE.

S202: The called UE sends a request response message to the core network device.

S203: The called UE sends a ring notification message to the core network device.

Specifically, for a specific process of performing the foregoing S201 to S203, refer to the foregoing descriptions of S101, S102, and S108 shown in FIG. 1. Details are not described herein again.

At this point, the called UE and a 4G core network device have completed the MT signaling interaction without a precondition. A calling UE has successfully called the called UE. It should be noted that MT signaling interaction between the called UE and a 3G core network device is similar to the MT signaling interaction shown in FIG. 2. Details are not described again in the present disclosure.

Still referring to FIG. 1 and FIG. 2, during the MT signaling interaction, the MT signaling interaction succeeds only when a last step (that is, S108 in FIG. 1 or S203 in FIG. 2) has been performed, in other words, the called UE has sent the ring notification message to the core network device. In this way, the called UE rings, and a called user notices a current incoming call of the calling UE based on the ringing of the called UE. If the MT signaling interaction fails, the called UE does not send the ring notification message to the core network device. In this case, the called UE does not ring, resulting in that the called user cannot notice the current incoming call of the calling UE by using the called UE, and man-machine interaction is not intelligent enough.

The incoming call processing method, the user equipment, and the storage medium used in the embodiments of the present disclosure are intended to resolve a technical problem in the prior art that called UE does not ring if MT signaling interaction between the called UE and a core network device fails, resulting in that a called user cannot notice a current incoming call of calling UE, and man-machine interaction is not intelligent enough.

The technical solutions of the present disclosure and how the foregoing technical problem is resolved in the technical solutions of the present disclosure are described below in detail by using specific embodiments. The following several specific embodiments may be combined with each other. Details of same or similar concepts or processes may not be described in some embodiments.

Figure 3:
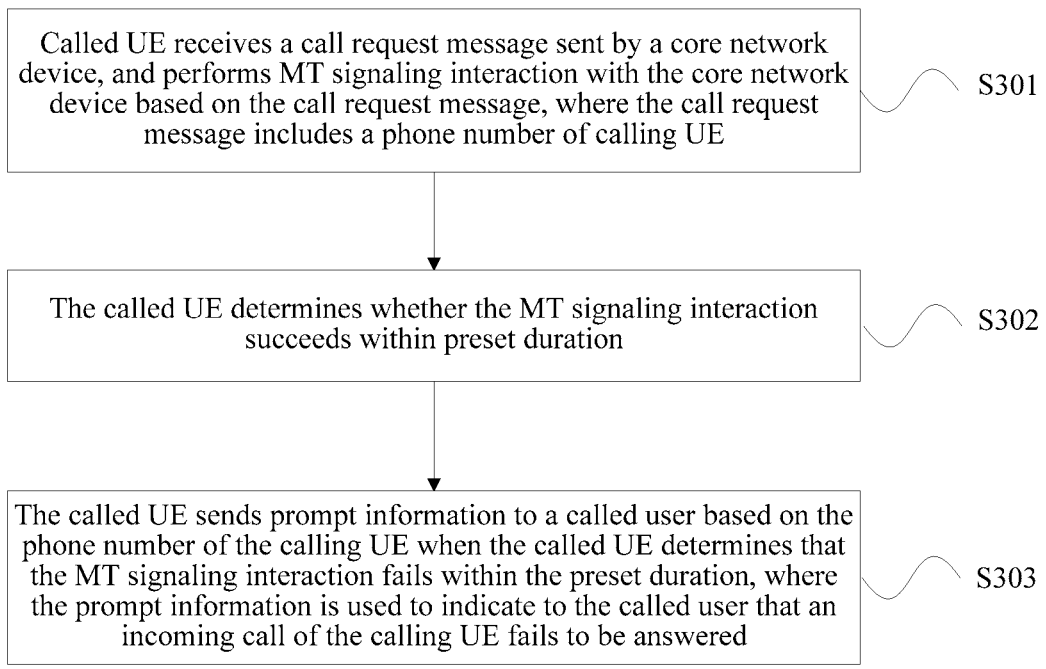
FIG. 3 is a schematic flowchart of Embodiment 1 of an incoming call processing method according to an embodiment of the present disclosure.

FIG. 3 is a schematic flowchart of Embodiment 1 of an incoming call processing method according to an embodiment of the present disclosure. Embodiment 1 relates to a specific process as follows: During MT signaling interaction performed by called UE and a core network device, when the called UE determines that the MT signaling interaction fails, the called UE sends reminder information to a called user, to remind the called user that an incoming call of calling UE fails to be answered. As shown in FIG. 3, the method includes the following steps.

S301: The called UE receives a call request message sent by the core network device, and performs the MT signaling interaction with the core network device based on the call request message, where the call request message includes a phone number of the calling UE.

Specifically, when the calling UE calls the called UE by using the core network device, the called UE may receive the call request message sent by the core network device, so that the called UE may perform the MT signaling interaction with the core network device based on the call request message. The call request message carries the phone number of the calling UE, and may further carry a time of initiating a call by the calling UE, or the like.

When the called UE is located in a 3G core network, the MT signaling interaction that needs to be performed by the called UE and the core network device, for example, may be the MT signaling interaction shown in FIG. 2. When the called UE is located in a 4G core network, the MT signaling interaction that needs to be performed by the called UE and the core network device, for example, may be MT signaling interaction with a precondition (that is, the MT signaling interaction shown in FIG. 1), or may be MT signaling interaction without a precondition (that is, the MT signaling interaction shown in FIG. 2). Which type of MT signaling interaction is specifically used is related to whether the core network device and the called UE support a precondition.

S302: The called UE determines whether the MT signaling interaction succeeds within preset duration.

Specifically, after receiving the call request message sent by the core network device, the called UE may determine whether the MT signaling interaction between the called UE and the core network device succeeds within the preset duration. Optionally, the called UE may determine, based on whether a ring notification message is sent to the core network device within the preset duration (for example, S108 shown in FIG. 1 or S203 shown in FIG. 2), whether the MT signaling interaction between the called UE and the core network device succeeds. Optionally, the called UE may further determine, based on whether a ring is sent to the called user within the preset duration, whether the MT signaling interaction between the called UE and the core network device succeeds.

The preset duration discussed in the foregoing may be greater than or equal to duration consumed by the called UE to perform the MT signaling interaction with the core network device in a normal case, that is, is greater than or equal to duration consumed to perform the foregoing S102 to S108 shown in FIG. 1 or perform the foregoing S202 and S203 shown in FIG. 2. During specific setting, the preset duration may be determined based on a requirement of the called user or a networking condition of a core network in which the called UE is located.

S303: The called UE sends prompt information to the called user based on the phone number of the calling UE when the called UE determines that the MT signaling interaction fails within the preset duration, where the prompt information is used to indicate to the called user that the incoming call of the calling UE fails to be answered.

Specifically, when determining that the MT signaling interaction between the called UE and the core network device fails, the called UE may send the prompt information to the called user based on the phone number of the calling UE carried in the received call request message, to inform the called user that the incoming call of the calling UE fails to be answered. Optionally, the called UE may display a missed incoming call notification in a user interface (for example, a system notification screen or an incoming call notification screen) of the called UE based on the phone number of the calling UE, and may further use a voice assistant or the like to speak the missed incoming call notification or the like to the called user. The missed incoming call notification may include the phone number of the calling UE or a username corresponding to the phone number of the calling UE, and may further include a call time, a quantity of calls, or the like.

In the prior art, when the MT signaling interaction between the called UE and the core network device fails, the called UE does not ring, resulting in that the called user cannot notice a current incoming call of the calling UE, and man-machine interaction is not intelligent enough. In the incoming call processing method provided in this embodiment, after receiving the call request message sent by the core network device, the called UE may determine whether the MT signaling interaction between the called UE and the core network device succeeds. When determining that the MT signaling interaction fails, the called UE may send the prompt information to the called user in time. In this way, the called user may notice the current incoming call of the calling UE based on the prompt information, thereby further making man-machine interaction more intelligent, and at the same time improving experience of the called user.

It should be noted that the foregoing incoming call processing method is applicable to a scenario in with one calling UE calls the called UE by using the core network device (that is, the called UE receives one call request message sent by the core network device), or may further be applicable to a scenario in which a plurality of calling UEs call the called UE at the same time by using the core network device (that is, the called UE receives a plurality of call request messages sent by the core network device). When the method is applicable to the scenario in which the plurality of calling UEs call the called UE at the same time, the called UE may perform the foregoing S301 to S303 respectively and in parallel based on each call request message.

A first calling UE and a second calling UE are used as an example. It is assumed that the first calling UE and the second calling UE call the called UE at the same time by using the core network device. To be specific, the called UE receives at the same time a first call request message (carrying a phone number of the first calling UE) and a second call request message (carrying a phone number of the second calling UE) sent by the core network device. The called UE may perform the foregoing S301 to S303 respectively and in parallel based on the first call request message and the second call request message. To be specific, the called UE performs first MT signaling interaction with the core network device based on a first call request message, and determines whether the first MT signaling interaction succeeds. If the first MT signaling interaction fails, the called UE sends the prompt information to the user, to inform the user that the incoming call of the first calling UE fails to be answered. At the same time, the called UE performs second MT signaling interaction with the core network device in parallel based on the second call request message, and determines whether the second MT signaling interaction succeeds. If the second MT signaling interaction fails, the called UE may send the prompt information to the user, to inform the user that the incoming call of the second calling UE fails to be answered.

For the incoming call processing method provided in this embodiment of the present disclosure, after receiving the call request message sent by the core network device, the called UE may determine whether the MT signaling interaction between the called UE and the core network device succeeds, and may send the prompt information to the called user in time when determining that the MT signaling interaction fails. In this way, the called user may notice the current incoming call of the calling UE based on the prompt information, thereby making man-machine interaction more intelligent, and at the same time improving experience of the called user.

Further, based on the foregoing embodiment, this embodiment relates to a specific process of how the called UE determines whether the MT signaling interaction succeeds within the preset duration after the called UE receives the call request message sent by the core network device.

Specifically, the following three cases may be included.

First case: When the called UE determines that the ring notification message is not sent to the core network device within the preset duration, the called UE determines that the MT signaling interaction fails. The ring notification message is used to instruct the core network device to send a ring back tone to the calling UE.

Specifically, in the prior art, in the process in which the called UE performs the MT signaling interaction with the core network device, if a modem of the called UE is suddenly restarted or a signal of the called UE is interrupted, the MT signaling interaction between the called UE and the core network device is forced to stop. Consequently, the called UE does not send the ring notification message to the core network device within the preset duration, resulting in that the MT signaling interaction between the called UE and the core network device fails. In this case, the called UE does not ring for the called user, and the called user cannot notice the current incoming call of the calling UE by using the called UE.

In this embodiment, when the called UE does not send the ring notification message to the core network device within the preset duration, the called UE may accordingly determine that the MT signaling interaction between the called UE and the core network device fails. In this way, the called UE may accordingly send the prompt information to the called user, to enable the called user to notice the current incoming call of the calling UE based on the prompt information, thereby further making man-machine interaction more intelligent, and at the same time improving experience of the called user.

Second case: When the called UE determines that a hang-up notification message sent by the core network device is received within the preset duration, the called UE determines that the MT signaling interaction fails. The hang-up notification message is used to instruct the called UE to interrupt the MT signaling interaction with the core network device.

Specifically, in the prior art, in the process in which the core network device and the called UE perform the MT signaling interaction, if the core network device finds that a previous voice bearer link of the called UE is not removed, or, a server of the core network device encounters an error, or another case resulting in that the core network device and the called UE can no longer continue to perform MT signaling interaction occurs, the core network device sends the hang-up notification message to the called UE, to instruct the called UE to interrupt the MT signaling interaction with the core network device. After receiving the hang-up notification message, the called UE interrupts the MT signaling interaction with the core network device based on the hang-up notification message, resulting in that the MT signaling interaction between the called UE and the core network device fails. In this case, the called UE does not ring for the called user, and the called user cannot notice the current incoming call of the calling UE by using the called UE.

In this embodiment, when receiving, within the preset duration, the hang-up notification message sent by the core network device, the called UE may accordingly determine that the MT signaling interaction between the called UE and the core network device fails. In this way, the called UE may accordingly send the prompt information to the called user, to enable the called user to notice the current incoming call of the calling UE based on the prompt information, thereby further making man-machine interaction more intelligent, and at the same time improving experience of the called user.

Third case: When the called UE determines that a ring notification message is sent to the core network device within the preset duration, the called UE determines that the MT signaling interaction succeeds.

Specifically, when the called UE sends the ring notification message to the core network device within the preset duration, the called UE may accordingly determine that the MT signaling interaction between the called UE and the core network device succeeds. In this way, the called UE does not send the prompt information to the called user, thereby saving the signaling overheads, and reducing power consumption of the called UE.

For the incoming call processing method provided in this embodiment of the present disclosure, after receiving the call request message sent by the core network device, the called UE may determine whether the MT signaling interaction between the called UE and the core network device succeeds, and may send the prompt information to the called user in time when determining that the MT signaling interaction fails. In this way, the called user may notice the current incoming call of the calling UE based on the prompt information, thereby making man-machine interaction more intelligent, and at the same time improving experience of the called user.

It should be noted that during specific implementation of the foregoing embodiments, the preset duration used in the foregoing embodiments may be implemented by setting one timer in the called UE. Optionally, in another implementation of the present disclosure, the preset duration may include first duration and second duration. During specific implementation, two timers (for example, a timer 1 and a timer 2) may be set in the called UE to implement the foregoing first duration and second duration. Duration of the timer 1 may correspond to the first duration, and duration of the timer 2 may correspond to the second duration. The first duration discussed herein may be equal to or slightly greater than duration consumed to normally perform S102 to S108 shown in FIG. 1, that is, duration consumed when the calling UE successfully calls the called UE once. The second duration may be buffering waiting duration, and is a time constructed for the calling UE of which the incoming call fails to be answered to call the called UE again. By using this manner, accuracy of the prompt information sent by the called UE to the called user can be improved.

The incoming call processing method provided in this embodiment of the present disclosure is described below in detail with reference to application scenarios and by using specific examples:

First application scenario: In the process in which the called UE performs the MT signaling interaction with the core network device, the called UE receives, within the preset duration, the hang-up notification message sent by the core network device.

That the preset duration includes first duration and second duration is used as an example. The first duration may be equal to or slightly greater than duration consumed to normally perform S102 to S108 shown in FIG. 1. The second duration may be buffering waiting duration. In this application scenario, that the called UE receives, within the preset duration, the hang-up notification message sent by the core network device may specifically include the following three cases:

Case A: The called UE receives, within the first duration, the hang-up notification message sent by the core network device, and does not receive, again within the second duration, the call request message sent by the core network device (that is, the called UE fails to perform the MT signaling interaction with the core network device within the first duration, but the calling UE does not call the called UE again by using the core network device within the second duration).

Figure 4:
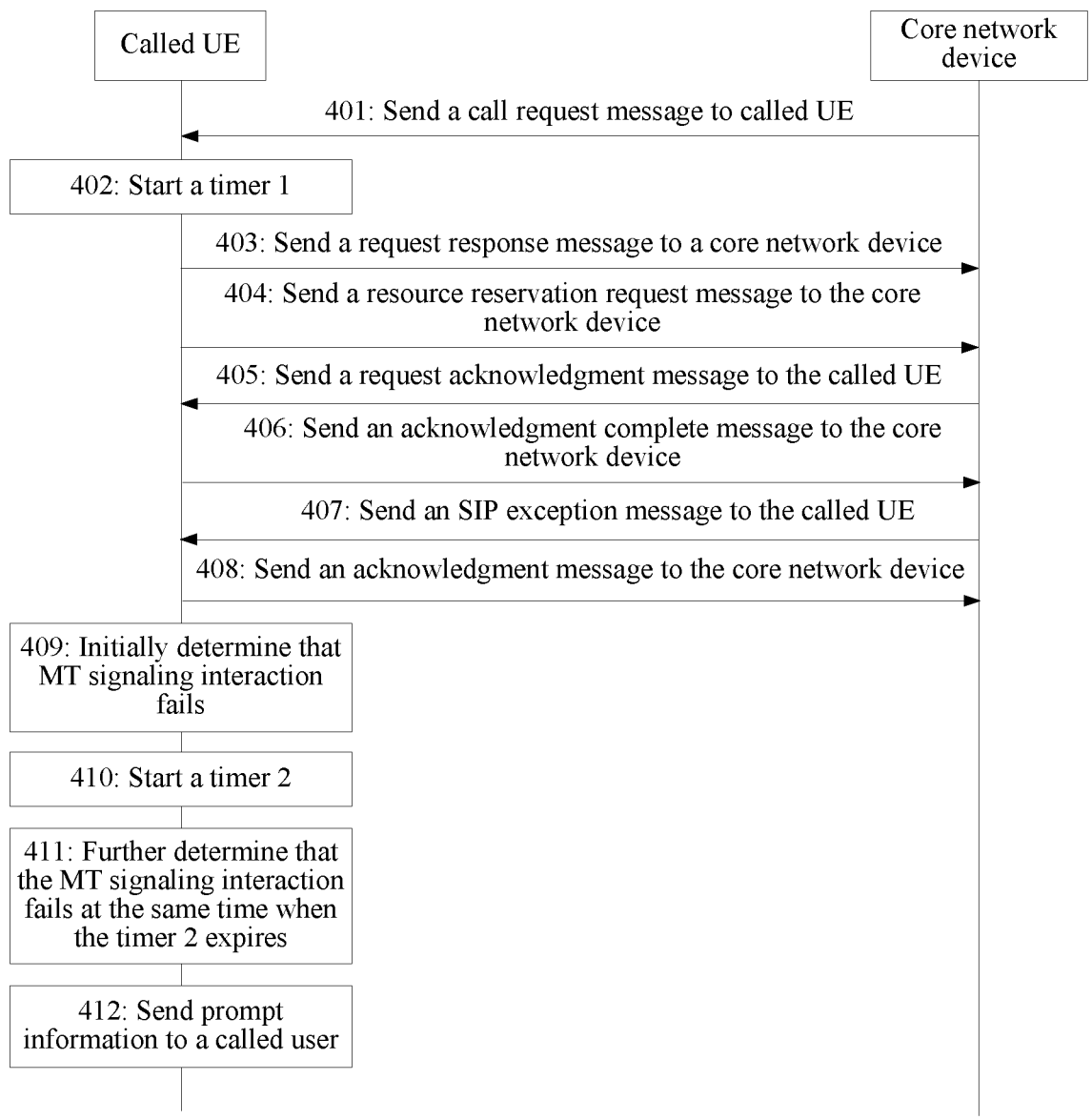
FIG. 4 is a signaling flowchart of Embodiment 2 of an incoming call processing method according to an embodiment of the present disclosure.

MT signaling interaction with a precondition between called UE and a 4G core network device is used as an example. FIG. 4 is a signaling flowchart of Embodiment 2 of an incoming call processing method according to an embodiment of the present disclosure. In this embodiment, a hang-up notification message sent by the core network device is a Session Initiation Protocol (Session Initiation Protocol, SIP for short) exception message. A timer 1 and a timer 2 are set in the called UE. Duration of the timer 1 corresponds to first duration, and duration of the timer 2 corresponds to second duration. As shown in FIG. 4, the method includes the following steps.

S401: The core network device sends a call request message to the called UE.

Specifically, for a specific process of performing the foregoing S401, refer to the foregoing description of S101 shown in FIG. 1. Details are not described herein again.

S402: The called UE starts the timer 1.

S403: The called UE sends a request response message to the core network device.

S404: The called UE sends a resource reservation request message to the core network device.

S405: The core network device sends a request acknowledgment message to the called UE.

S406: The called UE sends an acknowledgment complete message to the core network device.

Specifically, for a specific process of performing the foregoing S403 to S406, refer to the foregoing description of S102 to S105 shown in FIG. 1. Details are not described herein again.

S407: The core network device sends the SIP exception message to the called UE.

Specifically, in the process in which the core network device and the called UE perform MT signaling interaction, if the core network device finds that a previous voice bearer link of the called UE is not removed, or, a server of the core network device encounters an error, or another case resulting in that the core network device and the called UE can no longer continue to perform MT signaling interaction occurs, the core network device sends the SIP exception message to the called UE, to instruct the called UE to interrupt the MT signaling interaction with the core network device.

S408: The called UE sends an acknowledgment message to the core network device.

Specifically, the acknowledgment message is used to indicate to the core network device that the called UE has received the SIP exception message.

After the step, the called UE interrupts the MT signaling interaction with the core network device.

S409: The called UE initially determines that the MT signaling interaction fails.

Specifically, because the called UE receives, before the timer 1 expires, the SIP exception message (that is, a hang-up notification) that is sent by the core network device and that is used to instruct the called UE to interrupt the MT signaling interaction, the called UE interrupts the MT signaling interaction with the core network device based on the SIP exception message, resulting in that the MT signaling interaction between the called UE and the core network device fails. Therefore, the called UE may initially determine, by using the received SIP exception message, that the MT signaling interaction between the called UE and the core network device fails.

Optionally, the called UE may determine, based on the received SIP exception message, that the MT signaling interaction fails. Therefore, during specific implementation of this embodiment, at the same time when the timer 1 expires, the called UE may determine, based on the SIP exception message, that the MT signaling interaction fails; and may further determine that the MT signaling interaction fails at the same time when receiving the SIP exception message. If the timer 1 still has not expired at this time, the called UE may turn off the timer 1 and perform S410.

S410: The called UE starts the timer 2.

Specifically, the called UE constructs again, by using the second duration constructed by the timer 2, a time of calling the called UE for calling UE of which an incoming call fails to be answered.

S411: The called UE further determines that the MT signaling interaction fails at the same time when the timer 2 expires.

In this embodiment, the called UE interrupts the MT signaling interaction with the core network device based on the received SIP exception message within the first duration (in other words, before the timer 1 expires). As a result, the incoming call of the calling UE calling the called UE fails to be answered. The calling UE does not call the called UE again by using the core network device within the second duration (in other words, before the timer 2 expires). To be specific, the call request message sent by the core network device is not received by the called UE again within the second duration (in other words, before the timer 2 expires). In this case, the called UE may further determine, by using the state, that the MT signaling interaction between the called UE and the core network device thoroughly fails, and perform S412.

During specific implementation, the called UE may determine, based on a phone number of the calling UE carried in the call request that is sent by the core network device and that is received within the first duration, that is, based on the phone number of the calling UE carried in the call request message in S401, whether a call request carrying the phone number of the same calling UE is received within the second duration, and further determine whether the calling UE calls the called UE again by using the core network device.

S412: The called UE sends prompt information to a called user.

Specifically, for a specific process of performing the foregoing S412, refer to the foregoing description of S303 shown in FIG. 3. Details are not described herein again.

Figure 5:
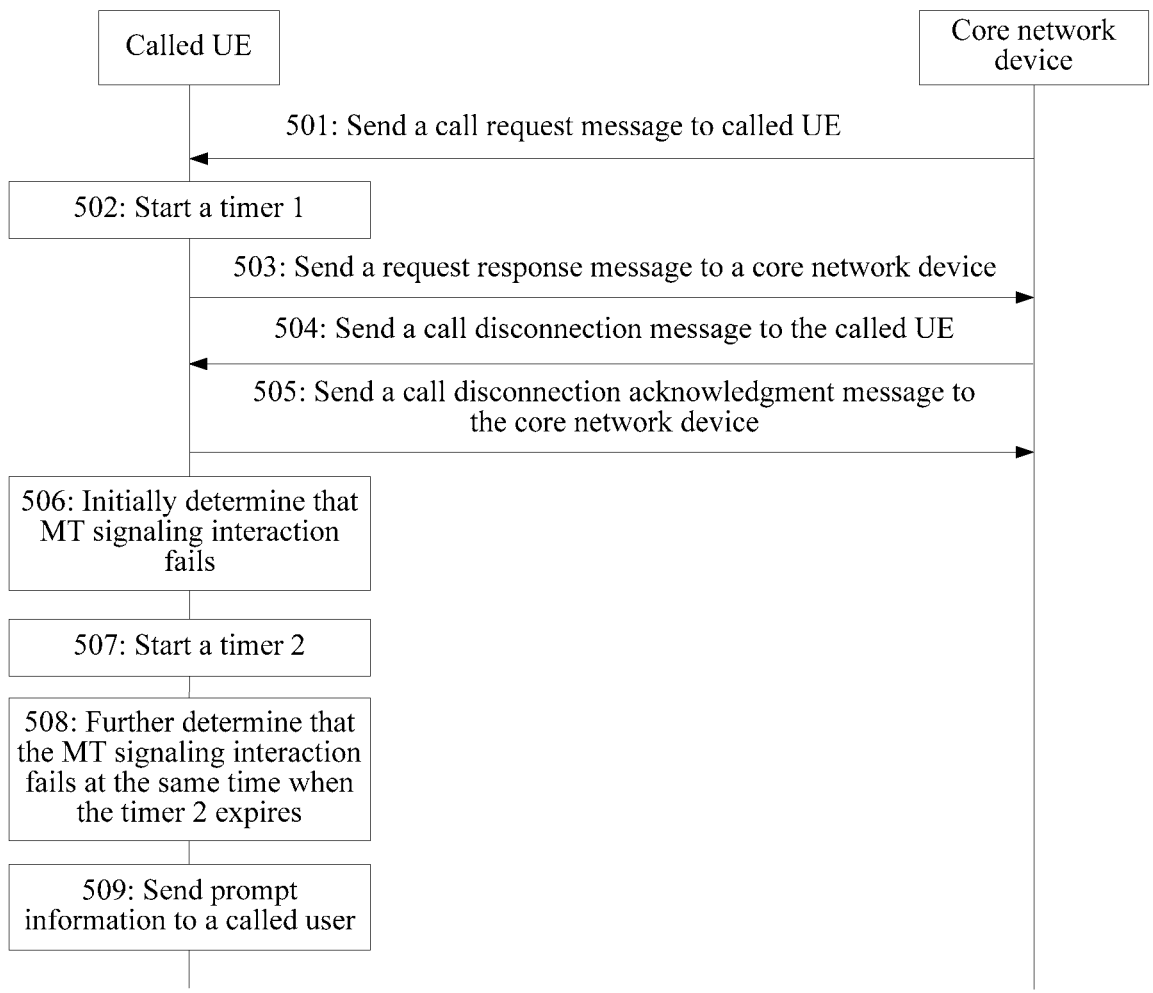
FIG. 5 is a signaling flowchart of Embodiment 3 of an incoming call processing method according to an embodiment of the present disclosure.

MT signaling interaction between called UE and a 3G core network device is used as an example. FIG. 5 is a signaling flowchart of Embodiment 3 of an incoming call processing method according to an embodiment of the present disclosure. In this embodiment, a hang-up notification message sent by the core network device is a call disconnection message. A timer 1 and a timer 2 are set in the called UE. Duration of the timer 1 corresponds to first duration, and duration of the timer 2 corresponds to second duration. As shown in FIG. 5, the method includes the following steps.

S501: The core network device sends a call request message to the called UE.

Specifically, for a specific process of performing the foregoing S501, refer to the foregoing description of S201 shown in FIG. 2. Details are not described herein again.

S502: The called UE starts the timer 1.

S503: The called UE sends a request response message to the core network device.

Specifically, for a specific process of performing the foregoing S503, refer to the foregoing description of S202 shown in FIG. 2. Details are not described herein again.

S504: The core network device sends the call disconnection message to the called UE.

Specifically, in the process in which the core network device and the called UE perform the MT signaling interaction, if a call of calling UE ends because of a poor radio signal, or the calling UE actively hangs up the phone, or another case resulting in that the core network device and the called UE can no longer continue to perform MT signaling interaction occurs, the core network device sends the call disconnection message to the called UE, to instruct the called UE to interrupt the MT signaling interaction with the core network device.

S505: The called UE sends a call disconnection acknowledgment message to the core network device.

Specifically, the call disconnection acknowledgment message is used to indicate to the core network device that the called UE has received the call disconnection message.

After the step, the called UE interrupts the MT signaling interaction with the core network device.

S506: The called UE initially determines that the MT signaling interaction fails.

Specifically, because the called UE receives, before the timer 1 expires, the call disconnection message (that is, a hang-up notification) that is sent by the core network device and that is used to instruct the called UE to interrupt the MT signaling interaction, the called UE interrupts the MT signaling interaction with the core network device based on the call disconnection message, resulting in that the MT signaling interaction between the called UE and the core network device fails. Therefore, the called UE may initially determine, by using the received call disconnection message, that the MT signaling interaction between the called UE and the core network device fails.

Optionally, the called UE may determine, based on the received call disconnection message, that the MT signaling interaction fails. Therefore, during specific implementation of this embodiment, at the same time when the timer 1 expires, the called UE may determine, based on the call disconnection message, that the MT signaling interaction fails; and may further determine that the MT signaling interaction fails at the same time when receiving the call disconnection message. If the timer 1 still has not expired at this time, the called UE may turn off the timer 1 and perform S507.

S507: The called UE starts the timer 2.

Specifically, the called UE constructs again, by using the second duration constructed by the timer 2, a time of calling the called UE for calling UE of which an incoming call fails to be answered.

S508: The called UE further determines that the MT signaling interaction fails at the same time when the timer 2 expires.

In this embodiment, the called UE interrupts the MT signaling interaction with the core network device based on the received call disconnection message within the first duration (in other words, before the timer 1 expires). As a result, the incoming call of the calling UE calling the called UE fails to be answered. The calling UE does not call the called UE again by using the core network device within the second duration (in other words, before the timer 2 expires). To be specific, the call request message sent by the core network device is not received by the called UE again within the second duration (in other words, before the timer 2 expires). In this case, the called UE may further determine, by using the state, that the MT signaling interaction between the called UE and the core network device thoroughly fails, and perform S509.

During specific implementation, the called UE may determine, based on a phone number of the calling UE carried in a call request that is sent by the core network device and that is received within the first duration, that is, based on the phone number of the calling UE carried in a call request in S501, whether a call request carrying the phone number of the same calling UE is received within the second duration, and further determine whether the calling UE calls the called UE again by using the core network device.

S509: The called UE sends prompt information to a called user.

Specifically, for a specific process of performing the foregoing S509, refer to the foregoing description of S303 shown in FIG. 3. Details are not described herein again.

It should be noted that MT signaling interaction without a precondition between the called UE and a 4G core network device is similar to the MT signaling interaction between the called UE and the 3G core network device. Therefore, for the incoming call processing method used if Case A occurs in the process in which the called UE and the 4G core network device perform the MT signaling interaction without a precondition, refer to the incoming call processing method shown in FIG. 5. Details are not described again.

In the prior art, after the called UE interrupts the MT signaling interaction with the core network device based on the hang-up notification message sent by the core network device, that is, the MT signaling interaction between the called UE and the core network device fails, the called UE does not ring if the calling UE does not call the called UE again, resulting in that the called user cannot notice a current incoming call of the calling UE by using the called UE, and man-machine interaction is not intelligent enough. In this embodiment, after the called UE interrupts the MT signaling interaction with the core network device within the first duration based on the hang-up notification message sent by the core network device, the called UE may initially determine, by using the hang-up notification message, that the MT signaling interaction between the called UE and the core network device fails. If the calling UE does not call the called UE again within the preset second duration, the called UE may further determine that the MT signaling interaction between the called UE and the core network device fails. As a result, the called UE may send the prompt information to the called user in time. In this way, the called user may notice the current incoming call of the calling UE in time based on the prompt information, thereby making man-machine interaction more intelligent, and at the same time improving experience of the called user.

Case B: The called UE receives, within the first duration, the hang-up notification message sent by the core network device, but does not send a ring notification message to the core network device when the MT signaling interaction is performed again with the core network device within the second duration (that is, the called UE fails to perform the MT signaling interaction with the core network device within the first duration, and the calling UE calls the called UE again by using the core network device within the second duration. However, when the called UE and the core network device perform the MT signaling interaction again, the signaling interaction fails again).

The MT signaling interaction with a precondition between the called UE and the 4G core network device is used as an example. Referring to the foregoing FIG. 4, it is assumed that after the called UE starts the timer 2 (after S410 and before S411), the calling UE calls the called UE again by using the core network device, that is, the called UE receives again the call request message sent by the core network device (the call request and the call request message used in S401 are the same call request message, that is, the phone number of the calling UE carried in the call request and the phone number of the calling UE carried in the call request message used in S401 are the same number), and performs the MT signaling interaction with the core network device again. However, the MT signaling interaction fails again, and the called UE still does not send the ring notification message to the core network device, resulting in that the called UE still does not ring to indicate the incoming call of the calling UE to the called user. During Step S411, the called UE may further determine, by using the state (that is, the called UE does not send the ring notification message to the core network device again), that the MT signaling interaction between the called UE and the core network device thoroughly fails, to perform the foregoing S412.

Optionally, if the MT signaling interaction that is performed by the called UE and the core network device again succeeds, and the called UE sends the ring notification message to the core network device (that is, the called UE rings to indicate the incoming call of the calling UE to the called user), in step S411, the called UE may further determine, by using the ring notification message, that the MT signaling interaction between the called UE and the core network device succeeds, and the procedure ends. The called UE no longer needs to indicate to the called UE a previous incoming call of the calling UE that fails to be answered. By using this manner, accuracy of sending, by the called UE, the prompt information to the called user can be improved, thereby making man-machine interaction more intelligent, and further improving experience of the called user.

Optionally, in another implementation, if the calling UE calls the called UE again before the timer 2 expires, that is, the called UE receives again a call request sent by the core network device, the called UE may actively turn off the timer 2 after receiving the call request, and restart the timer 1. If the MT signaling interaction between the called UE and the core network device fails before the restarted timer 1 expires, the called UE starts the timer 2 again. If the calling UE calls the called UE again, that is, the called UE receives again the call request sent by the core network device before the timer 2 expires, the called UE may turn off the timer 2 again and restart the timer 1. This cycle is repeated until the calling UE does not call the called UE again (that is, the signaling interaction fails), or, the called UE sends a ring notification message to the core network device (that is, the signaling interaction succeeds) after the MT signaling interaction between the called UE and the core network device fails. By using this manner, the time of calling the UE again may be constructed a plurality of times for the calling UE of which the incoming call fails to be answered. In this way, the called UE may send the prompt information to the user after the incoming call of the calling UE thoroughly fails to be answered, thereby improving accuracy of sending the prompt information to the user, and making man-machine interaction more intelligent.

The MT signaling interaction between the called UE and the 3G core network device is used as an example. Referring to the foregoing FIG. 5, it is assumed that after the called UE starts the timer 2 (after S507 and before S508), the calling UE calls the called UE again by using the core network device, that is, the called UE receives again the call request message sent by the core network device (the call request and the call request message used in S501 are the same call request message, that is, the phone number of the calling UE carried in the call request and the phone number of the calling UE carried in the call request message used in S401 are the same number), and performs the MT signaling interaction with the core network device again. However, the MT signaling interaction fails again, and the called UE still does not send the ring notification message to the core network device, resulting in that the called UE still does not ring to indicate the incoming call of the calling UE to the called user. In this case, during the foregoing S508, the called UE may further determine, by using the state (that is, the called UE does not send the ring notification message to the core network device again), that the MT signaling interaction between the called UE and the core network device thoroughly fails, to perform the foregoing S509.

Optionally, if the MT signaling interaction that is performed by the called UE and the core network device again succeeds, and the called UE sends the ring notification message to the core network device (that is, the called UE rings to indicate the incoming call of the calling UE to the called user), the called UE may further determine, by using the ring notification message, that the MT signaling interaction between the called UE and the core network device succeeds, and the procedure ends. The called UE no longer needs to indicate a previous incoming call of the calling UE that fails to be answered to the called UE. By using this manner, accuracy of sending, by the called UE, the prompt information to the called user can be improved, thereby making man-machine interaction more intelligent, and further improving experience of the called user.

Optionally, in another implementation, if the calling UE calls the called UE again before the timer 2 expires, that is, the called UE receives again a call request sent by the core network device, the called UE may actively turn off the timer 2 after receiving the call request, and restart the timer 1. If the MT signaling interaction between the called UE and the core network device fails before the restarted timer 1 expires, the called UE starts the timer 2 again. If the calling UE calls the called UE again, that is, the called UE receives again a call request sent by the core network device before the timer 2 expires, the called UE may turn off the timer 2 again and restart the timer 1. This cycle is repeated until the calling UE does not call the called UE again (that is, the signaling interaction fails), or, the called UE sends a ring notification message to the core network device (that is, the signaling interaction succeeds) after the MT signaling interaction between the called UE and the core network device fails. By using this manner, the time of calling the UE again may be constructed a plurality of times for the calling UE of which the incoming call fails to be answered. In this way, the called UE may send the prompt information to the user after the incoming call of the calling UE thoroughly fails to be answered, thereby improving accuracy of sending the prompt information to the user, and making man-machine interaction more intelligent.

It should be noted that the MT signaling interaction without a precondition between the called UE and the 4G core network device is similar to the MT signaling interaction between the called UE and the 3G core network device. Therefore, for the incoming call processing method used if Case B occurs in the process in which the called UE and the 4G core network device perform the MT signaling interaction without a precondition, refer to the foregoing incoming call processing method shown in FIG. 5. Details are not described again.

In the prior art, after the called UE interrupts the MT signaling interaction with the core network device based on the hang-up notification message sent by the core network device, that is, the MT signaling interaction between the called UE and the core network device fails, although the calling UE calls the called UE again by using the core network device, the called UE still does not ring because the MT signaling interaction that is performed by the called UE and the core network device again fails. As a result, the called user cannot notice the current incoming call of the calling UE by using the called UE, and man-machine interaction is not intelligent enough. In this embodiment, after the called UE interrupts the MT signaling interaction with the core network device within the first duration based on the hang-up notification message sent by the core network device, the called UE may initially determine, by using the hang-up notification message, that the MT signaling interaction between the called UE and the core network device fails. If the calling UE does not successfully call the called UE again (that is, the called UE does not send the ring notification message to the core network device again, that is, the called UE still does not ring) within the preset second duration, the called UE may further determine that the MT signaling interaction between the called UE and the core network device fails. As a result, the called UE may send the prompt information to the called user in time. In this way, the called user may notice the current incoming call of the calling UE in time based on the prompt information, thereby making man-machine interaction more intelligent, and at the same time improving experience of the called user.

Case C: The called UE does not send the ring notification message to the core network device within the first duration, but receives, within the second duration, the hang-up notification message sent by the core network device.

Figure 6:
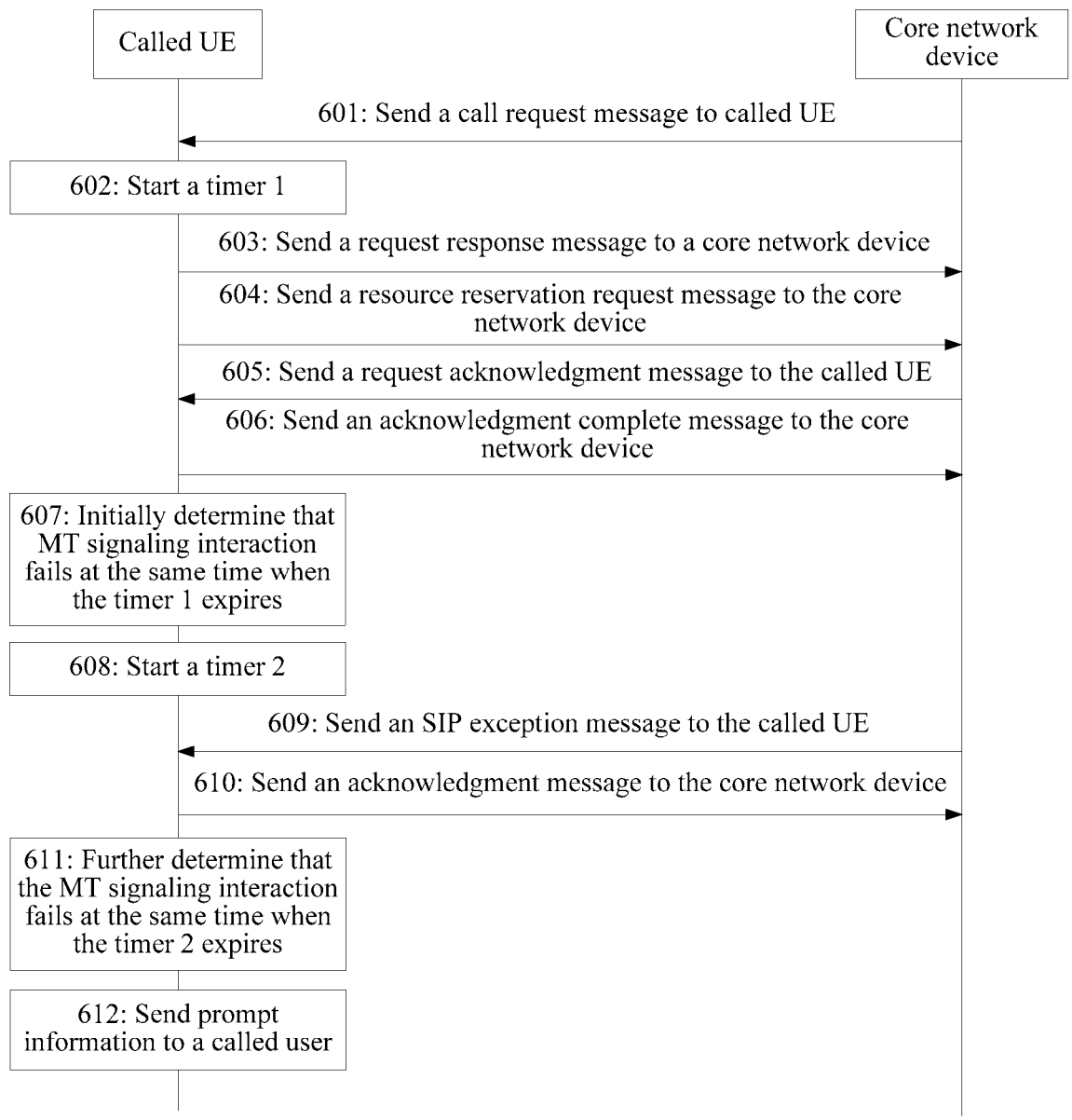
FIG. 6 is a signaling flowchart of Embodiment 4 of an incoming call processing method according to an embodiment of the present disclosure.

MT signaling interaction with a precondition between called UE and a 4G core network device is used as an example. FIG. 6 is a signaling flowchart of Embodiment 4 of an incoming call processing method according to an embodiment of the present disclosure. In this embodiment, a hang-up notification message sent by the core network device is an SIP exception message. A timer 1 and a timer 2 are set in the called UE. Duration of the timer 1 corresponds to first duration, and duration of the timer 2 corresponds to second duration. As shown in FIG. 6, the method includes the following steps.

S601: The core network device sends a call request message to the called UE.

S602: The called UE starts the timer 1.

S603: The called UE sends a request response message to the core network device.

S604: The called UE sends a resource reservation request message to the core network device.

S605: The core network device sends a request acknowledgment message to the called UE.

S606: The called UE sends an acknowledgment complete message to the core network device.

Specifically, for a specific process of performing the foregoing S601 to S606, refer to the foregoing description of S401 to S406 shown in FIG. 4. Details are not described herein again.

S607: The called UE initially determines that MT signaling interaction fails at the same time when the timer 1 expires.

Specifically, before the timer 1 expires, the called UE does not receive the SIP exception message (that is, a hang-up notification) that is sent by the core network device and that is used to instruct the called UE to interrupt the MT signaling interaction and does not send a ring notification message to the core network device. In this case, the called UE initially determines, by using the state, that the MT signaling interaction between the called UE and the core network device fails.

S608: The called UE starts the timer 2.

Specifically, for a specific process of performing the foregoing S608, refer to the foregoing description of S410 shown in FIG. 4. Details are not described herein again.

S609: The core network device sends the SIP exception message to the called UE.

S610: The called UE sends an acknowledgment message to the core network device.

Specifically, for a specific process of performing the foregoing S609 and S610, refer to the foregoing description of S407 and S408 shown in FIG. 4. Details are not described herein again.

After the step, the called UE interrupts the MT signaling interaction with the core network device.

S611: The called UE further determines that the MT signaling interaction fails at the same time when the timer 2 expires.

Specifically, because the called UE receives, before the timer 2 expires, the SIP exception message (that is, the hang-up notification message) that is sent by the core network device and that is used to instruct the called UE to interrupt the MT signaling interaction, the called UE interrupts the MT signaling interaction with the core network device based on the SIP exception message, resulting in that the MT signaling interaction between the called UE and the core network device fails. Therefore, the called UE may further determine, by using the state, that the MT signaling interaction between the called UE and the core network device thoroughly fails, and the called UE performs S612.

S612: The called UE sends prompt information to a called user.

Specifically, for a specific process of performing the foregoing S612, refer to the foregoing description of S412 shown in FIG. 4. Details are not described herein again.

Figure 7:
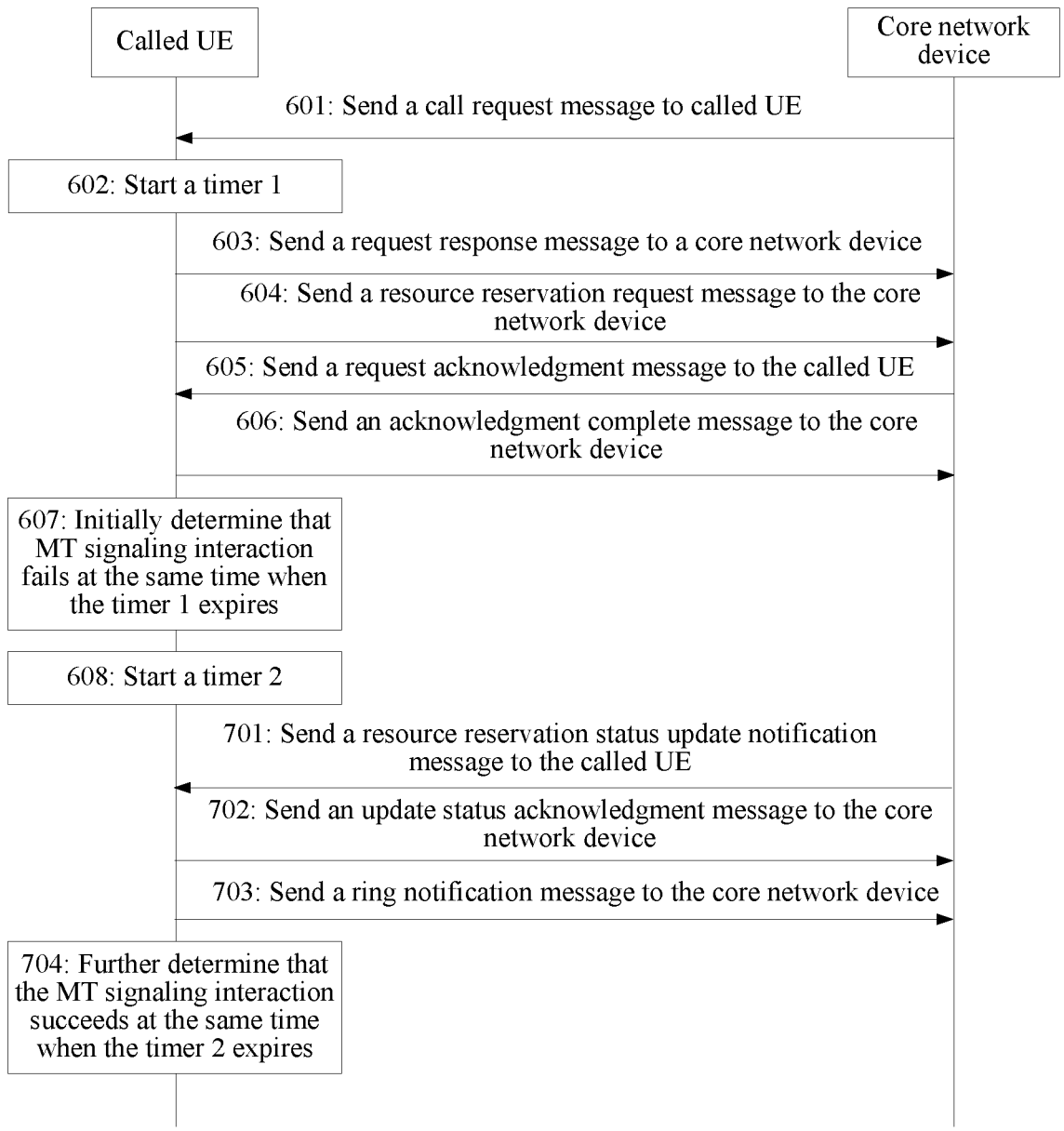
FIG. 7 is a signaling flowchart of Embodiment 5 of an incoming call processing method according to an embodiment of the present disclosure.

FIG. 7 is a signaling flowchart of Embodiment 5 of an incoming call processing method according to an embodiment of the present disclosure. This embodiment relates to a specific process in which called UE does not send a ring notification message to a core network device within first duration but sends the ring notification message to the core network device within second duration. As shown in FIG. 7, based on FIG. 6 in the foregoing, the foregoing S609 to S612 may further be replaced with the following steps.

S701: The core network device sends a resource reservation status update notification message to the called UE.

S702: The called UE sends an update status acknowledgment message to the core network device.

S703: The called UE sends the ring notification message to the core network device.

Specifically, for a specific process of performing the foregoing S701 to S703, refer to the foregoing description of S106 to S108 shown in FIG. 1. Details are not described herein again.

S704: The called UE further determines that the MT signaling interaction succeeds at the same time when the timer 2 expires.

Specifically, in this embodiment, before the timer 2 expires, the called UE sends the ring notification message to the core network device, that is, the MT signaling interaction between the called UE and the core network device succeeds. That is, the called UE rings to indicate a current incoming call of calling UE to a called user. Therefore, the called UE may further determine, by using the state, that the MT signaling interaction between the called UE and the core network device succeeds. In this case, the called UE does not send prompt information to the called user, thereby saving the signaling overheads, and reducing power consumption of the called UE.

Optionally, in another embodiment, if the foregoing S701 to S704 occur before S607, that is, before the foregoing S607 is performed, the called UE determines that the called UE sends the ring notification message to the core network device before a timer 1 expires. The called UE determines, before the timer 1 expires, that the MT signaling interaction succeeds. The called UE may no longer need to start the timer 2, and the procedure directly ends.

Optionally, in an implementation of the present disclosure, after the foregoing S703, the method further includes: recording, by the called UE, consumed duration of the MT signaling interaction.

Specifically, when the called UE is in different core networks, the called UE consumes different duration to perform the MT signaling interaction normally with the core network device. Therefore, when the first duration corresponds to duration consumed to normally perform S102 to S108 shown in FIG. 1, the called UE may record actual consumed duration of successfully performing the MT signaling interaction with the core network device each time, so that the called user may adjust the first duration based on the actual consumed duration recorded by the called UE, or, the called UE adaptively adjusts the first duration based on the actual consumed duration, to ensure accuracy of the specified first duration, to further ensure the accuracy of determining, by the called UE by using the first duration and the second duration, whether the MT signaling interaction succeeds.

Figure 8:
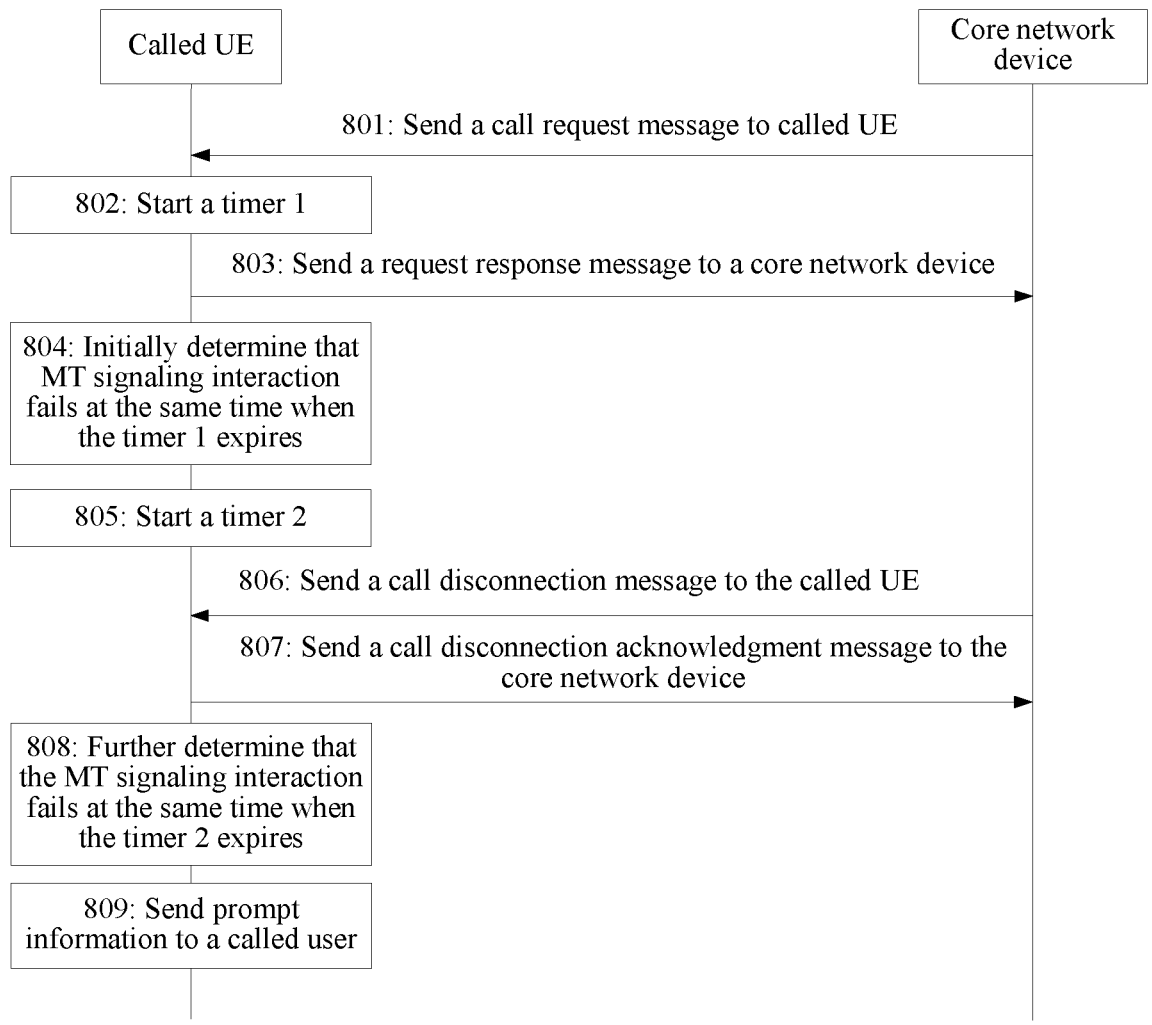
FIG. 8 is a signaling flowchart of Embodiment 6 of an incoming call processing method according to an embodiment of the present disclosure.

MT signaling interaction between called UE and a 3G core network device is used as an example. FIG. 8 is a signaling flowchart of Embodiment 6 of an incoming call processing method according to an embodiment of the present disclosure. In this embodiment, a hang-up notification message sent by the core network device is a call disconnection message. A timer 1 and a timer 2 are set in the called UE. Duration of the timer 1 corresponds to first duration, and duration of the timer 2 corresponds to second duration. As shown in FIG. 8, the method includes the following steps.

S801: The core network device sends a call request message to the called UE.

S802: The called UE starts the timer 1.

S803: The called UE sends a request response message to the core network device.

Specifically, for a specific process of performing the foregoing S801 to S803, refer to the foregoing description of S501 to S503 shown in FIG. 5. Details are not described herein again.

S804: The called UE initially determines that the MT signaling interaction fails at the same time when the timer 1 expires.

Specifically, before the timer 1 expires, the called UE does not receive the call disconnection message (that is, a hang-up notification) that is sent by the core network device and that is used to instruct the called UE to interrupt the MT signaling interaction, and does not send a ring notification message to the core network device. In this case, the called UE initially determines, by using the state, that the MT signaling interaction between the called UE and the core network device fails.

S805: The called UE starts the timer 2.

Specifically, for a specific process of performing the foregoing S805, refer to the foregoing description of S507 shown in FIG. 5. Details are not described herein again.

S806: The core network device sends the call disconnection message to the called UE.

S807: The called UE sends a call disconnection acknowledgment message to the core network device.

Specifically, for a specific process of performing the foregoing S806 and S807, refer to the foregoing description of S504 to S505 shown in FIG. 5. Details are not described herein again.

After the step, the called UE interrupts the MT signaling interaction with the core network device.

S808: The called UE further determines that the MT signaling interaction fails at the same time when the timer 2 expires.

Specifically, because the called UE receives, before the timer 2 expires, the call disconnection message (that is, a hang-up notification) that is sent by the core network device and that is used to instruct the called UE to interrupt the MT signaling interaction, the called UE interrupts the MT signaling interaction with the core network device based on the call disconnection message, resulting in that the MT signaling interaction between the called UE and the core network device fails. Therefore, the called UE may further determine, by using the state, that the MT signaling interaction between the called UE and the core network device thoroughly fails, and the called UE performs S809.

S809: The called UE sends prompt information to a called user.

Specifically, for a specific process of performing the foregoing S809, refer to the foregoing description of S509 shown in FIG. 5. Details are not described herein again.

Figure 9:
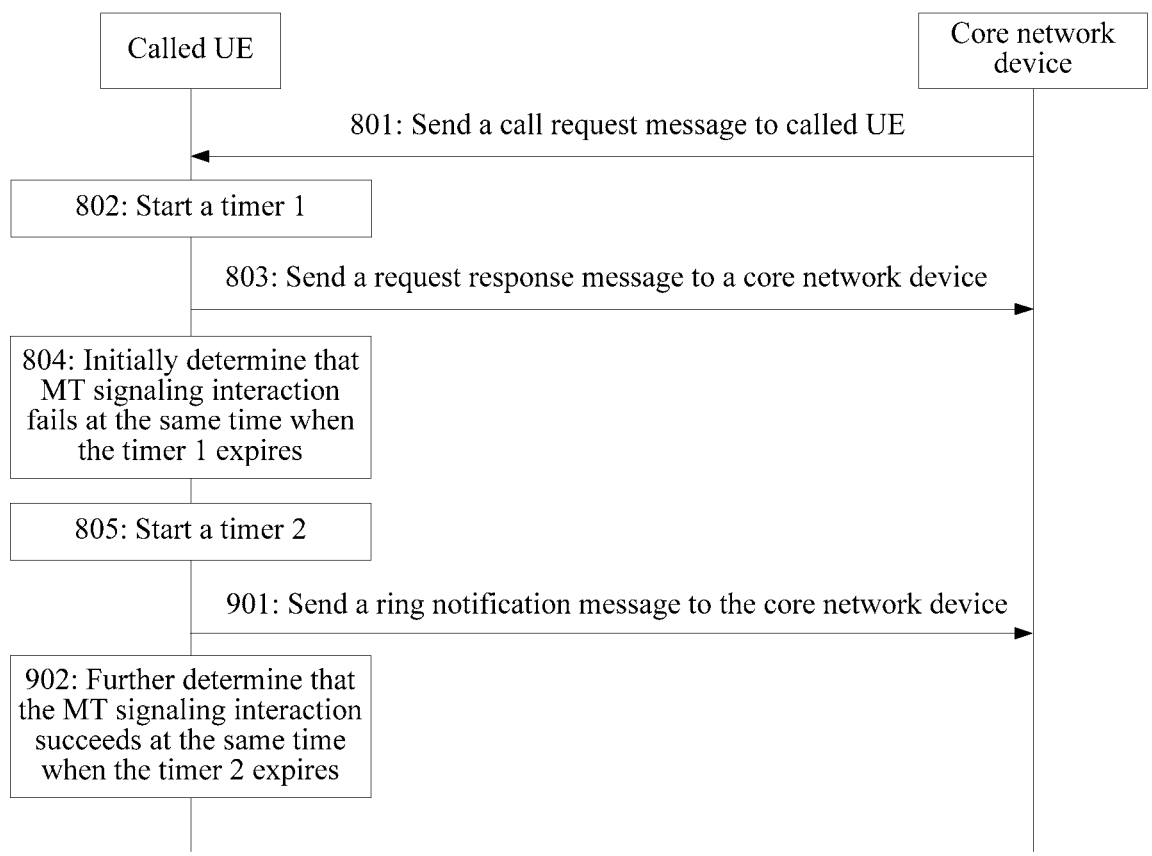
FIG. 9 is a signaling flowchart of Embodiment 7 of an incoming call processing method according to an embodiment of the present disclosure.

FIG. 9 is a signaling flowchart of Embodiment 7 of an incoming call processing method according to an embodiment of the present disclosure. This embodiment relates to a specific process in which called UE does not send a ring notification message to a core network device within first duration but sends the ring notification message to the core network device within second duration. As shown in FIG. 9, based on FIG. 8 in the foregoing, the foregoing S806 to S809 may further be replaced with the following steps.

S901: The called UE sends the ring notification message to the core network device.

Specifically, for a specific process of performing the foregoing S901, refer to the foregoing description of S203 shown in FIG. 2. Details are not described herein again.

S902: The called UE further determines that the MT signaling interaction succeeds at the same time when a timer 2 expires.

Specifically, in this embodiment, before the timer 2 expires, the called UE sends the ring notification message to the core network device, that is, the MT signaling interaction between the called UE and the core network device succeeds. That is, the called UE rings to indicate a current incoming call of calling UE to a called user. Therefore, the called UE may further determine, by using the state, that the MT signaling interaction between the called UE and the core network device succeeds. In this case, the called UE does not send prompt information to the called user, thereby saving the signaling overheads, and reducing power consumption of the called UE.

Optionally, in another embodiment, if the foregoing S901 and S902 occur before S804, that is, before the foregoing S804 is performed, the called UE determines that the called UE sends the ring notification message to the core network device before a timer 1 expires. The called UE determines, before the timer 1 expires, that the MT signaling interaction succeeds. The called UE may no longer need to start the timer 2, and the procedure directly ends.

Optionally, in an implementation of the present disclosure, after the foregoing S901, the method further includes: recording, by the called UE, consumed duration of the MT signaling interaction.

Specifically, when the called UE is in different core networks, the called UE consumes different duration to perform the MT signaling interaction normally with the core network device. Therefore, when the first duration corresponds to duration consumed to normally perform S202 and S203 shown in FIG. 2, the called UE may record actual consumed duration of successfully performing the MT signaling interaction with the core network device each time, so that the called user may adjust the first duration based on the actual consumed duration recorded by the called UE, or, the called UE adaptively adjusts the first duration based on the actual consumed duration, to ensure accuracy of the specified first duration, to further ensure accuracy of determining, by the called UE by using the first duration and the second duration, whether the MT signaling interaction succeeds.

It should be noted that MT signaling interaction without a precondition between the called UE and a 4G core network device is similar to the MT signaling interaction between the called UE and a 3G core network device. Therefore, for the incoming call processing method used if Case C occurs in the process in which the called UE and the 4G core network device perform the MT signaling interaction without a precondition, refer to the foregoing incoming call processing method shown in FIG. 8. Details are not described again.

In the prior art, after the called UE interrupts the MT signaling interaction with the core network device based on a hang-up notification message sent by the core network device, that is, the MT signaling interaction between the called UE and the core network device fails, the called UE does not ring, resulting in that the called user cannot notice the current incoming call of the calling UE by using the called UE, and man-machine interaction is not intelligent enough. In this embodiment, when the called UE interrupts the MT signaling interaction with the core network device based on the hang-up notification message sent by the core network device, the called UE may determine, by using the hang-up notification message, that the MT signaling interaction fails, so that the called UE may send the prompt information to the called user in time. The called user may notice the current incoming call of the calling UE in time based on the prompt information, thereby making man-machine interaction more intelligent, and at the same time improving experience of the called user.

Second application scenario: In the process in which the called UE performs the MT signaling interaction with the core network device, the called UE does not send the ring notification message to the core network device within preset duration. It should be noted that this case may be caused when a modem of the called UE is suddenly restarted or a signal of the called UE is interrupted.

Figure 10:
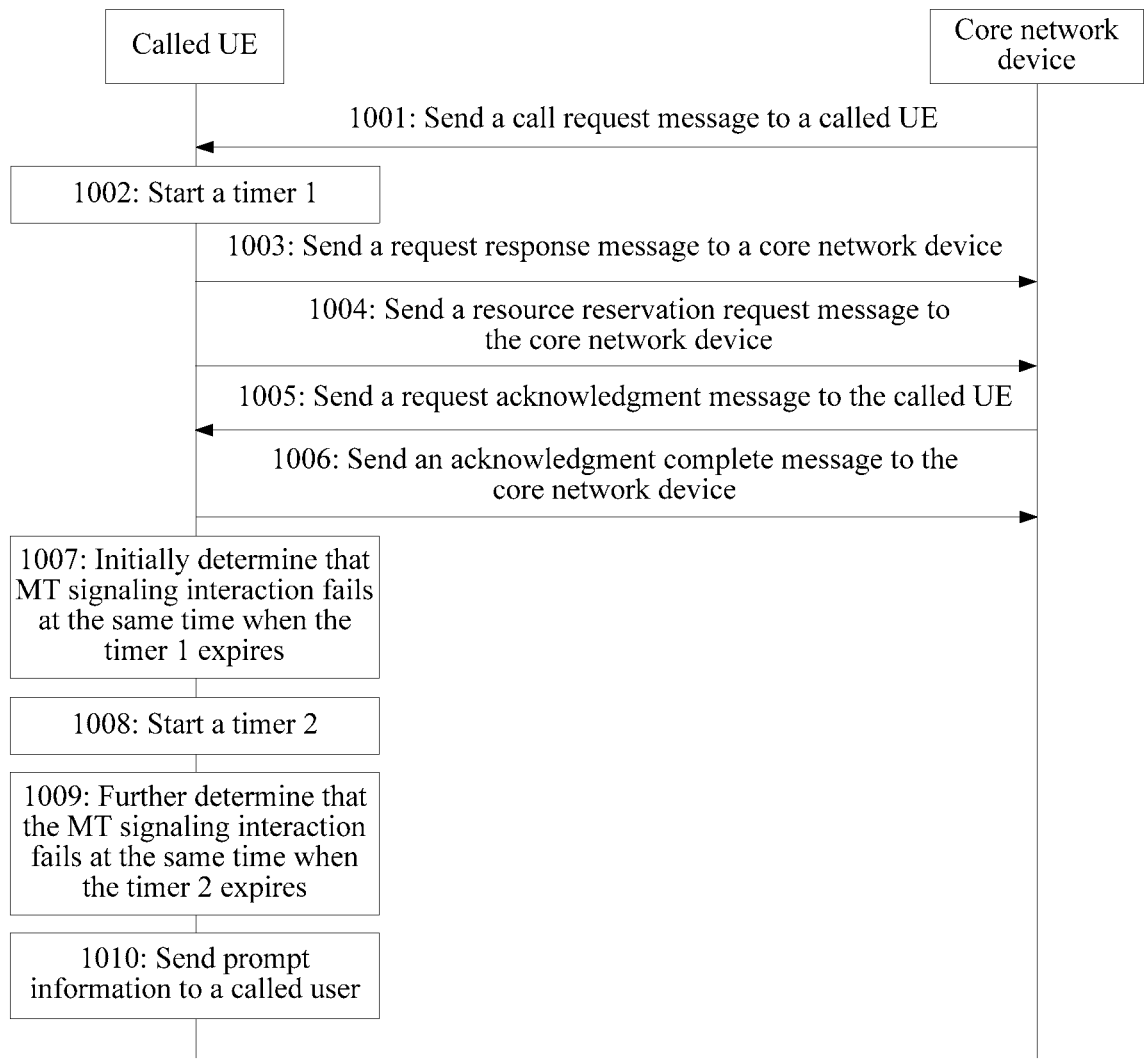
FIG. 10 is a signaling flowchart of Embodiment 8 of an incoming call processing method according to an embodiment of the present disclosure.

MT signaling interaction with a precondition between called UE and a 4G core network device is used as an example. FIG. 10 is a signaling flowchart of Embodiment 8 of an incoming call processing method according to an embodiment of the present disclosure. In this embodiment, A timer 1 and a timer 2 are set in the called UE. Duration of the timer 1 corresponds to first duration, and duration of the timer 2 corresponds to second duration. As shown in FIG. 10, the method includes the following steps.

S1001: The core network device sends a call request message to the called UE.

S1002. The called UE starts the timer 1.

S1003: The called UE sends a request response message to the core network device.

S1004: The called UE sends a resource reservation request message to the core network device.

S1005: The core network device sends a request acknowledgment message to the called UE.

S1006: The called UE sends an acknowledgment complete message to the core network device.

S1007: The called UE initially determines that MT signaling interaction fails at the same time when the timer 1 expires.

S1008: The called UE starts the timer 2.

Specifically, for a specific process of performing the foregoing S1001 to S1008, refer to the foregoing description of S601 to S608 shown in FIG. 6. Details are not described herein again.

S1009: The called UE further determines that the MT signaling interaction fails at the same time when the timer 2 expires.

Specifically, the called UE has not received the resource reservation status update notification message sent by the core network device (S106 in FIG. 1) before the timer 2 expires. In this case, the called UE cannot continue to perform the MT signaling interaction with the core network device. As a result, the called UE cannot send a ring notification message to the core network device. Therefore, the called UE further determines, by using the state, that the MT signaling interaction between the called UE and the core network device thoroughly fails. The called UE continues to perform S1010.

S1010: The called UE sends prompt information to a called user.

Specifically, for a specific process of performing the foregoing S1010, refer to the foregoing description of S612 shown in FIG. 6. Details are not described herein again.

Figure 11:
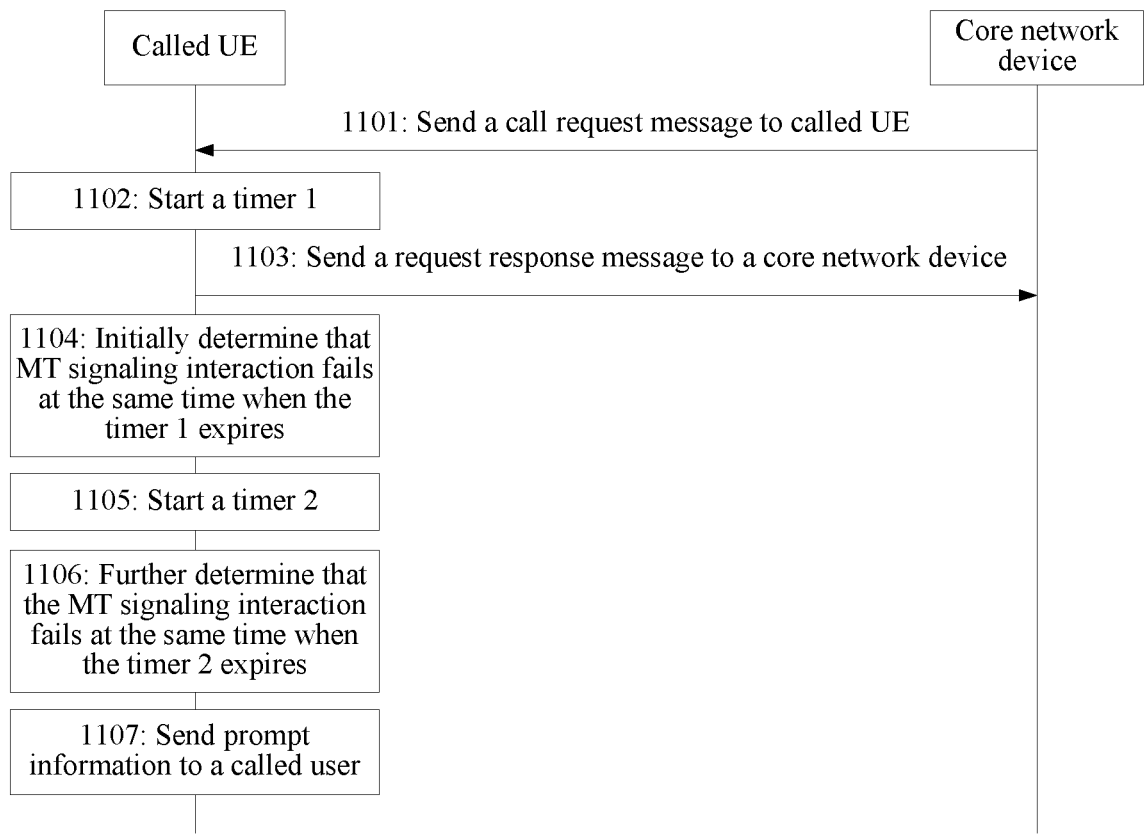
FIG. 11 is a signaling flowchart of Embodiment 9 of an incoming call processing method according to an embodiment of the present disclosure.

MT signaling interaction between called UE and a 3G core network device is used as an example. FIG. 11 is a signaling flowchart of Embodiment 9 of an incoming call processing method according to an embodiment of the present disclosure. In this embodiment, A timer 1 and a timer 2 are set in the called UE. Duration of the timer 1 corresponds to first duration, and duration of the timer 2 corresponds to second duration. As shown in FIG. 11, the method includes the following steps.

S1101: The core network device sends a call request message to the called UE.

S1102: The called UE starts the timer 1.

S1103: The called UE sends a request response message to the core network device.

S1104: The called UE initially determines that the MT signaling interaction fails at the same time when the timer 1 expires.

S1105: The called UE starts the timer 2.

Specifically, for a specific process of performing the foregoing S1101 to S1105, refer to the foregoing description of S801 to S805 shown in FIG. 8. Details are not described herein again.

S1106: The called UE further determines that the MT signaling interaction fails at the same time when the timer 2 expires.

Specifically, the called UE has not sent a ring notification message to the core network device before the timer 2 expires, the called UE further determines, by using the state, that the MT signaling interaction between the called UE and the core network device thoroughly fails, and the called UE continues to perform S1107.

S1107: The called UE sends prompt information to a called user.

Specifically, for a specific process of performing the foregoing S1107, refer to the foregoing description of S809 shown in FIG. 8. Details are not described herein again.

It should be noted that MT signaling interaction without a precondition between the called UE and a 4G core network device is similar to the MT signaling interaction between the called UE and the 3G core network device. Therefore, in the second application scenario, for the incoming call processing method used when the called UE and the 4G core network device perform the MT signaling interaction without a precondition, refer to the incoming call processing method in the foregoing FIG. 11. Details are not described again.

In the prior art, in the process in which the called UE performs the MT signaling interaction with the core network device, if a modem of the called UE is suddenly restarted or a signal of the called UE is interrupted, the called UE does not send the ring notification message to the core network device within preset duration. As a result, when the MT signaling interaction between the called UE and the core network device fails, the called UE does not ring, resulting in that the called user cannot notice a current incoming call of the calling UE by using the called UE, and man-machine interaction is not intelligent enough. In this embodiment, if the modem of the called UE is suddenly restarted or the signal of the called UE is interrupted, the called UE has not sent the ring notification message to the core network device within the preset duration. The called UE may determine, by using the state, that the MT signaling interaction between the called UE and the core network device fails, so that the called UE may send the prompt information to the called user in time. The called user may notice the current incoming call of the calling UE in time based on the prompt information, thereby making man-machine interaction more intelligent, and at the same time improving experience of the called user.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Figure 12:
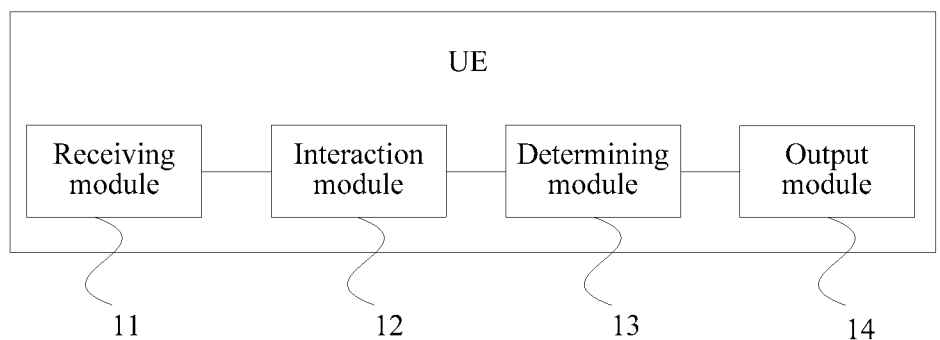
FIG. 12 is a schematic structural diagram of Embodiment 1 of user equipment according to an embodiment of the present disclosure.

FIG. 12 is a schematic structural diagram of Embodiment 1 of user equipment according to an embodiment of the present disclosure. As shown in FIG. 12, the user equipment UE may be called UE. The user equipment UE may include a receiving module 11, an interaction module 12, a determining module 13, and an output module 14.

The receiving module 11 is configured to receive a call request message sent by a core network device, where the call request message may include a phone number of calling UE.

The interaction module 12 is configured to perform MT signaling interaction with the core network device based on the call request message received by the receiving module 11.

The determining module 13 is configured to determine whether the MT signaling interaction succeeds within preset duration.

The output module 14 is configured to send prompt information to a called user based on the phone number of the calling UE when the determining module 13 determines that the MT signaling interaction fails within the preset duration. The prompt information may be used to indicate to the called user that an incoming call of the calling UE fails to be answered. Optionally, the output module 14 may be specifically configured to display a missed incoming call notification in a user interface based on the phone number of the calling UE. Optionally, the output module 14 may further be specifically configured to speak the missed incoming call notification to the called user based on the phone number of the calling UE.

The UE provided in this embodiment of the present disclosure can perform the foregoing method embodiments, and the implementation principles and technical effects thereof are similar. Details are not described herein again.

Further, based on the foregoing embodiment, that the determining module 13 is configured to determine whether the MT signaling interaction succeeds within preset duration is specifically:

the determining module 13 is specifically configured to determine that the MT signaling interaction fails when determining that a ring notification message is not sent by the interaction module 12 to the core network device within the preset duration, where the ring notification message is used to instruct the core network device to send a ring back tone to the calling UE; or the determining module 13 is specifically configured to determine that the MT signaling interaction fails when determining that the interaction module 12 receives, within the preset duration, a hang-up notification message sent by the core network device, where the hang-up notification message is used to instruct the interaction module 12 to interrupt the MT signaling interaction with the core network device. Optionally, when the UE is located in a 3G core network, the hang-up notification message may be a call disconnection message. When the UE is located in a 3G core network, the hang-up notification message may be a Session Initiation Protocol SIP exception message; or the determining module 13 is specifically configured to determine that the MT signaling interaction succeeds when determining that the interaction module 12 sends the ring notification message to the core network device within the preset duration.

When the preset duration includes first duration and second duration, that the determining module 13 is configured to determine that the MT signaling interaction fails when determining that the interaction module 12 receives, within the preset duration, a hang-up notification message sent by the core network device may be specifically:

the determining module 13 is specifically configured to determine that the MT signaling interaction fails when determining that the interaction module 12 receives the hang-up notification message within the first duration and the call request message sent by the calling UE by using the core network device is not received again within the second duration; or the determining module 13 is specifically configured to determine that the MT signaling interaction fails when determining that the interaction module 12 receives the hang-up notification message within the first duration and the ring notification message is not sent to the core network device when the MT signaling interaction is performed again with the core network device within the second duration; or the determining module 13 is specifically configured to determine that the MT signaling interaction fails when determining that the interaction module 12 does not send the ring notification message to the core network device within the first duration and receives the hang-up notification message within the second duration.

When the preset duration includes first duration and second duration, that the determining module 13 is configured to determine that the MT signaling interaction succeeds when determining that the interaction module 12 sends the ring notification message to the core network device within the preset duration may be specifically:

the determining module 13 is specifically configured to determine that the MT signaling interaction succeeds when determining that the interaction module 12 sends the ring notification message to the core network device within the first duration; or the determining module 13 is specifically configured to determine that the MT signaling interaction succeeds when determining that the interaction module 12 receives, within the first duration, a hang-up notification message sent by the core network device and the ring notification message is sent to the core network device when the MT signaling interaction is performed again with the core network device within the second duration; or the determining module 13 is specifically configured to determine that the MT signaling interaction succeeds when determining that the interaction module 12 does not send the ring notification message to the core network device within the first duration and sends the ring notification message to the core network device within the second duration.

The UE provided in this embodiment of the present disclosure can perform the foregoing method embodiments, and the implementation principles and technical effects thereof are similar. Details are not described herein again.

Figure 13:
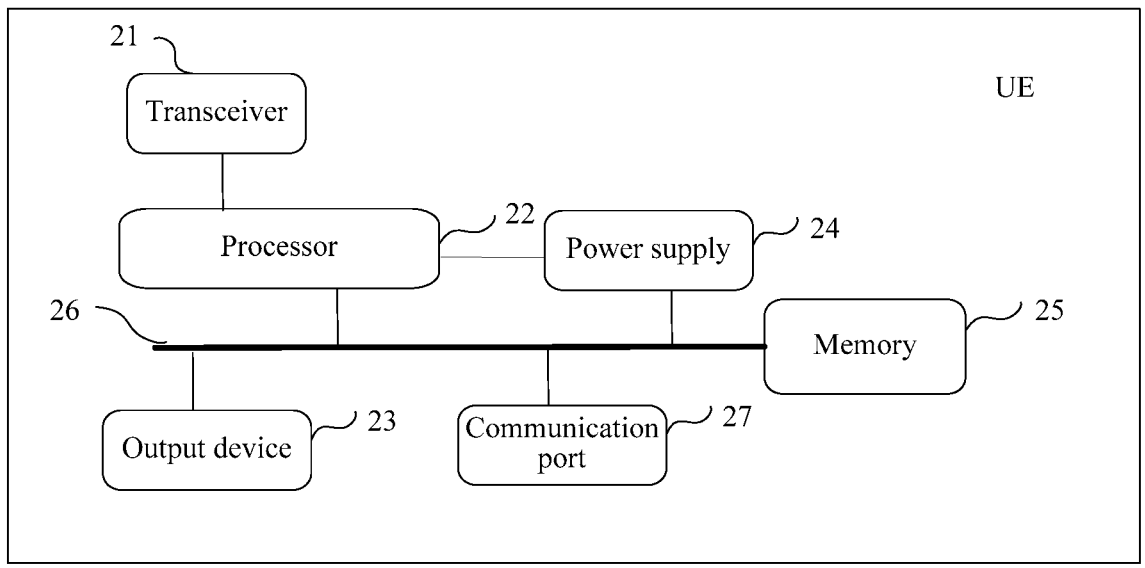
FIG. 13 is a schematic structural diagram of Embodiment 2 of user equipment according to an embodiment of the present disclosure.

FIG. 13 is a schematic structural diagram of Embodiment 2 of user equipment according to an embodiment of the present disclosure. As shown in FIG. 13, the user equipment UE may include a transceiver 21, a processor 22 (for example, a CPU), and an output device 23. The transceiver 21 may be integrated in a transceiver of the user equipment, or may be an independent transceiver antenna on the user equipment. The user equipment used in this embodiment of the present disclosure may further include a power supply 24, a memory 25, a communications bus 26, and a communication port 27. The communications bus 26 is configured to implement communication connection between components. The memory 25 may include a high-speed RAM memory, or may further include a non-volatile memory NVM, for example, at least one magnetic disk memory. The memory 25 may store various programs, to implement various processing functions and implement method steps of this embodiment. The communication port 27 is configured to implement connection and communication between the user equipment and another peripheral.

The transceiver 21 is configured to receive a call request message sent by a core network device, where the call request message may include a phone number of calling UE.

The processor 22 is configured to: perform, by using the transceiver 21, MT signaling interaction with the core network device based on the call request message received by the receiver 21, and determine whether the MT signaling interaction succeeds within preset duration.

The output device 23 is configured to send prompt information to a called user based on the phone number of the calling UE when the processor 22 determines that the MT signaling interaction fails within the preset duration, where the prompt information is used to indicate to the called user that an incoming call of the calling UE fails to be answered. Optionally, the output device 23 may be a device having a displaying function, and may be specifically configured to display a missed incoming call notification in a user interface based on the phone number of the calling UE. Optionally, the output device 23 may further be a device having an audio playing function, and may be specifically configured to speak the missed incoming call notification to the called user based on the phone number of the calling UE.

The UE provided in this embodiment of the present disclosure can perform the foregoing method embodiments, and the implementation principles and technical effects thereof are similar.

Details are not described herein again.

Further, based on the foregoing embodiment, that the processor 22 is configured to determine whether the MT signaling interaction succeeds within preset duration is specifically:

the processor 22 is specifically configured to determine that the MT signaling interaction fails when determining that a ring notification message is not sent to the core network device within the preset duration by using the transceiver 21, where the ring notification message discussed herein is used to instruct the core network device to send a ring back tone to the calling UE; or the processor 22 is specifically configured to determine that the MT signaling interaction fails when determining that a hang-up notification message sent by the core network device is received within the preset duration by using the transceiver 21, where the hang-up notification message discussed herein is used to instruct the processor 22 to interrupt the MT signaling interaction with the core network device; optionally, when the UE is located in a 3G core network, the hang-up notification message may be a call disconnection message; and when the UE is located in a 3G core network, the hang-up notification message may be a Session Initiation Protocol SIP exception message; or the processor 22 is specifically configured to determine that the MT signaling interaction succeeds when determining that the ring notification message is sent to the core network device within the preset duration by using the transceiver 21.

When the preset duration includes first duration and second duration, that the processor 22 is configured to determine that the MT signaling interaction fails when determining that the hang-up notification message sent by the core network device is received within the preset duration by using the transceiver 21 is specifically:

the processor 22 is specifically configured to determine that the MT signaling interaction fails when determining that the hang-up notification message is received within the first duration by using the transceiver 21 and the call request message sent by the calling UE by using the core network device is not received again within the second duration by using the transceiver 21; or the processor 22 is specifically configured to determine that the MT signaling interaction fails when determining that the hang-up notification message is received within the first duration by using the transceiver 21 and the ring notification message is not sent to the core network device by using the transceiver 21 when the MT signaling interaction is performed again with the core network device within the second duration by using the transceiver 21; or the processor 22 is specifically configured to determine that the MT signaling interaction fails when determining that the ring notification message is not sent to the core network device within the first duration by using the transceiver 21 and the hang-up notification message is received within the second duration by using the transceiver 21.

When the preset duration includes first duration and second duration, that the processor 22 is configured to determine that the MT signaling interaction succeeds when determining that the ring notification message is sent to the core network device within the preset duration by using the transceiver 21 is specifically:

the processor 22 is specifically configured to determine that the MT signaling interaction succeeds when determining that the ring notification message is sent to the core network device within the first duration by using the transceiver 21; or the processor 22 is specifically configured to determine that the MT signaling interaction succeeds when determining that the hang-up notification message sent by the core network device is received within the first duration by using the transceiver 21 and the ring notification message is sent to the core network device by using the transceiver 21 when the MT signaling interaction is performed again with the core network device within the second duration by using the transceiver 21; or the processor 22 is specifically configured to determine that the MT signaling interaction succeeds when determining that the ring notification message is not sent to the core network device within the first duration by using the transceiver 21 and the ring notification message is sent to the core network device within the second duration by using the transceiver 21.

The UE provided in this embodiment of the present disclosure can perform the foregoing method embodiments, and the implementation principles and technical effects thereof are similar. Details are not described herein again.

Figure 14:
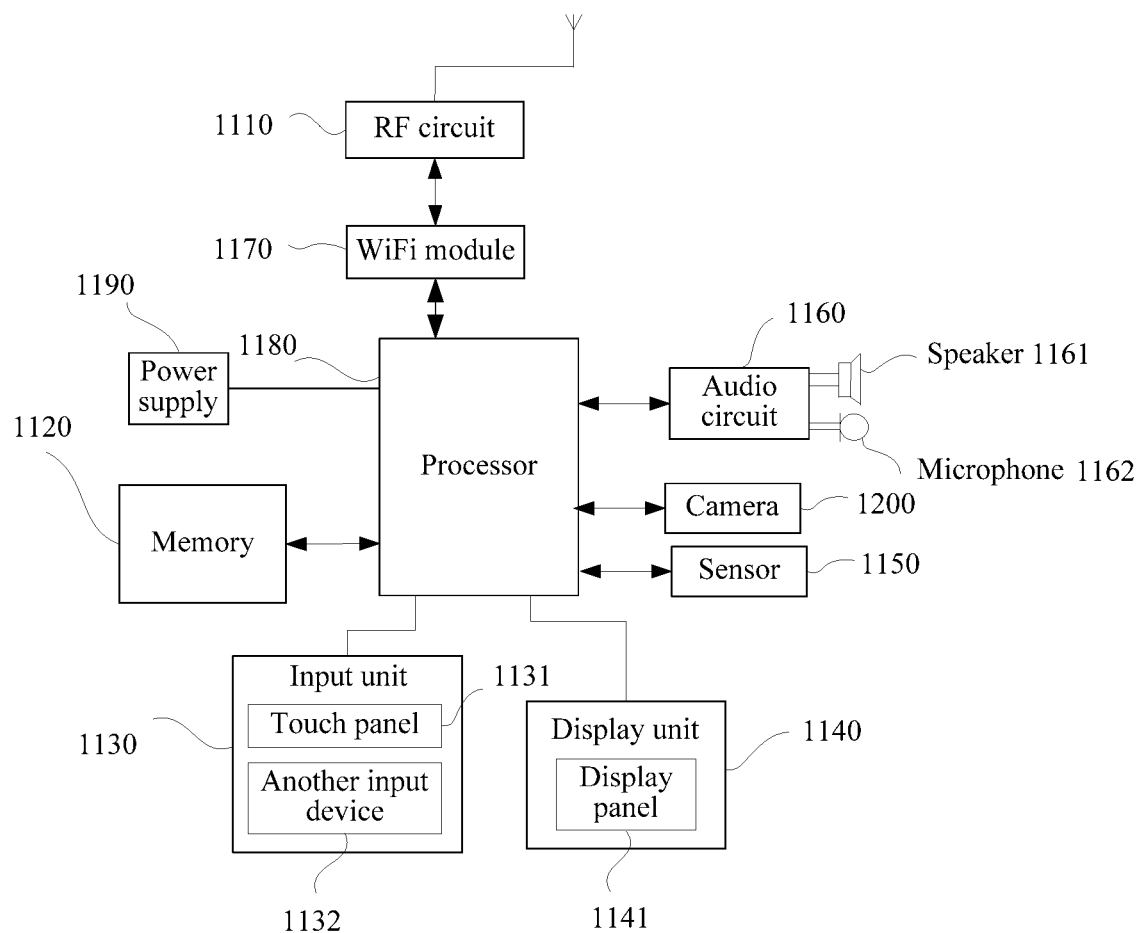
FIG. 14 is a structural block diagram of user equipment being a mobile phone according to an embodiment of the present disclosure.

As discussed in the foregoing embodiments, user equipment used in the embodiments of the present disclosure may be a wireless terminal such as a mobile phone and a tablet computer. Therefore, that the user equipment is a mobile phone is used as an example. FIG. 14 is a structural block diagram of the user equipment being the mobile phone according to an embodiment of the present disclosure. Referring for FIG. 14, the mobile phone may include components such as a radio frequency (Radio Frequency, RF) circuit 1110, a memory 1120, an input unit 1130, a display unit 1140, a sensor 1150, an audio circuit 1160, a Wireless Fidelity (wireless fidelity, WiFi) module 1170, a processor 1180, and a power supply 1190. Persons skilled in the art may understand that the structure of the mobile phone shown in FIG. 14 does not constitute a limitation to the mobile phone, and the mobile phone may include more components or fewer components than those shown in the figure, or some components may be combined, or a different component deployment may be used.

The following specifically describes the components of the mobile phone with reference to FIG. 14.

The RF circuit 1110 may be configured to receive and send signals in an information receiving and sending process or a call process. Particularly, the RF circuit 1110 receives downlink information from a base station, then delivers the downlink information to the processor 1180 for processing, and additionally sends uplink data to the base station. Generally, the RF circuit includes, but is not limited to, an antenna, at least one amplifier, a transceiver, a coupler, a low noise amplifier (Low Noise Amplifier, LNA), a duplexer, and the like. In addition, the RF circuit 1110 may also communicate with a network and another device through wireless communication. The wireless communication may use any communications standard or protocol, which includes, but is not limited to, Global System for Mobile Communications (Global System for Mobile Communications, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short message service (Short Message Service, SMS), and the like.

The memory 1120 may be configured to store a software program and module. The processor 1180 runs the software program and module stored in the memory 1120, to implement various functional applications and data processing of the mobile phone. The memory 1120 may mainly include a program storage area and a data storage area. The program storage area may store an operating system, an application program required by at least one function (such as a sound playback function and an image display function), and the like. The data storage area may store data (such as audio data and an address book) created based on use of the mobile phone, and the like. In addition, the memory 1120 may include a high speed random-access memory, and may further include a non-volatile memory, such as at least one magnetic disk storage device, a flash storage device, or another volatile solid-status storage device.

The input unit 1130 may be configured to receive input digit or character information, and generate keyboard signal input related to a user setting and function control of the mobile phone. Specifically, the input unit 1130 may include a touch panel 1131 and another input device 1132. The touch panel 1131, also referred to as a touchscreen, may collect a touch operation of a user on or near the touch panel 1131 (such as an operation of a user on the touch panel 1131 or near the touch panel 1131 by using any suitable object or accessory such as a finger or a stylus), and drive a corresponding connection apparatus according to a preset program. Optionally, the touch panel 1131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1180. Moreover, the touch controller can receive and execute a command sent from the processor 1180. In addition, the touch panel 1131 may be a resistive, a capacitive, an infrared, or a surface sound wave type touch panel. In addition to the touch panel 1131, the input unit 1130 may further include the another input device 1132. Specifically, the another input device 1132 may include, but is not limited to, one or more of a physical keyboard, a functional key (such as a volume control key or a switch key), a trackball, a mouse, and a joystick.

The display unit 1140 may be configured to display information input by the user or information provided for the user, and various menus of the mobile phone. The display unit 1140 may include a display panel 1141. Optionally, the display panel 1141 may be configured by using a liquid crystal display (Liquid Crystal Display, LCD), an organic light-emitting diode (Organic Light-Emitting Diode, OLED), or the like. Further, the touch panel 1131 may cover the display panel 1141. When detecting a touch operation on or near the touch panel 1131, the touch panel 1131 transfers the touch operation to the processor 1180 to determine a type of a touch event. Subsequently, the processor 1180 provides a corresponding visual output on the display panel 1141 based on the type of the touch event. Although, in FIG. 10, the touch panel 1131 and the display panel 1141 are used as two separate parts to implement input and output functions of the mobile phone, in some embodiments, the touch panel 1131 and the display panel 1141 may be integrated to implement the input and output functions of the mobile phone.

The mobile phone may further include at least one sensor 1150 such as an proximity sensor, a motion sensor, and other sensors. Specifically, the proximity sensor may include an ambient light sensor and a proximity sensor. The ambient light sensor may adjust luminance of the display panel 1141 according to brightness of ambient light. The proximity sensor may switch off the display panel 1141 and/or backlight when the mobile phone is moved to the ear. As one type of the motion sensor, an acceleration sensor may detect magnitude of accelerations in various directions (generally on three axes), may detect magnitude and a direction of the gravity when static, and may be configured to identify an application of the mobile phone gesture (such as switchover between landscape orientation and portrait orientation, a related game, and gesture calibration of a magnetometer), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 1160, a speaker 1161, and a microphone 1162 may provide an audio interface between the user and the mobile phone. The audio circuit 1160 may convert received audio data into an electric signal and transmit the electric signal to the speaker 1161. The speaker 1161 converts the electric signal into a sound signal for output. On the other hand, the microphone 1162 converts a collected sound signal into an electric signal. The audio circuit 1160 receives the electric signal and converts the electric signal into audio data, and outputs the audio data to the processor 1180 for processing. Then, the processor 1180 sends the audio data to, for example, another mobile phone by using the RF circuit 1110, or outputs the audio data to the memory 1120 for further processing.

WiFi belongs to a short distance wireless transmission technology. The mobile phone may help, by using the WiFi module 1170, the user receive and send e-mails, browse a web page, access streaming media, and or the like. The WiFi module 1170 provides wireless broadband Internet access for the user. Although FIG. 10 shows the WiFi module 1170, it may be understood that the WiFi module is not a necessary component of the mobile phone, and when required, the WiFi module may be omitted as long as the scope of the essence of the present disclosure is not changed.

The processor 1180 is a control center of the mobile phone, and is connected to various parts of the mobile phone by using various interfaces and lines. By running or executing the software program and/or module stored in the memory 1120, and invoking data stored in the memory 1120, the processor 1180 performs various functions and data processing of the mobile phone, thereby performing overall monitoring on the mobile phone. Optionally, the processor 1180 may include one or more processing units. In some implementations, the processor 1180 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1180.

The mobile phone further includes the power supply 1190 (such as a battery) for supplying power to the components. In some implementations, the power supply may be logically connected to the processor 1180 by using a power management system, thereby implementing functions such as charging, discharging and power consumption management by using the power management system.

The mobile phone may further include a camera 1200. The camera may be a front-facing camera or may be a rear-facing camera. Although not shown, the mobile phone may further include a Bluetooth module, a GPS module, or the like. Details are not described herein again.

In this embodiment of the present disclosure, the processor 1180 included in the mobile phone may be configured to perform the foregoing embodiments of the incoming call processing method, and have similar implementation principles and technical effects. Details are not described herein again.

In an embodiment of the present disclosure, a non-volatile computer-readable storage medium storing one or more programs is further provided. The one or more programs include an instruction. The instruction discussed herein enables, when being executed by an electronic device (for example, the user equipment UE shown in the foregoing) having a processor, a transceiver, and an output device, the electronic device to perform the following events:

receiving a call request message sent by a core network device, and performing MT signaling interaction with the core network device based on the call request message, where the call request message may include a phone number of calling UE;

determining whether the MT signaling interaction succeeds within preset duration; and sending prompt information based on the phone number of the calling UE when determining that the MT signaling interaction fails within the preset duration, where the prompt information is used to indicate that an incoming call of the calling UE fails to be answered.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present disclosure shall be subject to the protection scope of the claims.

What is claimed is:

1. An incoming call processing method, comprising:
   receiving, by a terminal device, a call request message from a core network;
   performing, by the terminal device, mobile terminated (MT) signaling interaction with the core network based on the call request message, wherein the call request message comprises a phone number of a calling device;
   determining, by the terminal device, whether the MT signaling interaction succeeds within a preset duration; and
   sending, by the terminal device, prompt information to a user of the terminal device responsive to a determination that the MT signaling interaction fails within the preset duration, wherein the prompt information indicate that the terminal device failed to answer an incoming call from the calling device, and wherein the prompt information comprises the phone number of the calling device.

2. The method of claim 1, wherein the sending step comprises:
   displaying, by the terminal device, a missed incoming call notification in an user interface based on the phone number of the calling device.

3. The method of claim 1, wherein the determining step comprises:
   determining, by the terminal device, that the MT signaling interaction fails based on that the terminal device failed to send a ring notification message to the core network within the preset duration, wherein the ring notification message is used to instruct the core network to send a ring back tone to the calling device.

4. The method of claim 3, wherein the preset duration comprises a first duration and a second duration, and the determining step based on that the terminal device failed to send the ring notification message comprises:
determining, by the terminal device, the MT signaling interaction fails based on:
failed to send the ring notification message to the core network within the first duration, and
receiving a hang-up notification message succesfully within the second duration.

5. The method of claim 1, wherein the determining step comprises:
determining, by the terminal device, that the MT signaling interaction fails based on a hang-up notification message from the core network within the preset duration, wherein the hang-up notification message is used to instruct the terminal device to interrupt the MT signaling interaction with the core network.

6. The method of claim 5, wherein the preset duration comprises a first duration and a second duration, and the determining step based on the hang-up notification message comprises:
determining, by the terminal device, that the MT signaling interaction fails based on:
receiving the hang-up notification message within the first duration, and
failed to receive another call request message within the second duration.

7. The method of claim 5, wherein the preset duration comprises a first duration and a second duration, and the determining step based on the hang-up notification message comprises:
determining, by the terminal device, that the MT signaling interaction fails based on:
receiving the hang-up notification message within the first duration, and
failed to send a ring notification message to the core network responsive to performing another MT signaling interaction with the core network within the second duration.

8. The method of claim 5, wherein the hang-up notification message is a Session Initiation Protocol (SIP) exception message.

9. The method of claim 5, wherein the hang-up notification message is a call disconnection message.

10. The method of claim 1, wherein the preset duration comprises a first duration and a second duration, and the determining step comprises:
determining, by the terminal device, that the MT signaling interaction succeeds responsive to a determination that a ring notification message is sent to the core network within the first duration.

11. The method of claim 1, wherein the preset duration comprises a first duration and a second duration, and the determining step comprises:
determining, by the terminal device, that the MT signaling interaction succeeds based on:
a determination that a hang-up notification message is received within the first duration, and
a determination that a ring notification message is successfully sent to the core network responsive to performing another MT signaling interaction within the second duration.

12. The method of claim 1, wherein the preset duration comprises a first duration and a second duration, and the determining step comprises:
determining, by the terminal device, that the MT signaling interaction succeeds based on:
a determination that the terminal device failed to send a ring notification message to the core network within the first duration, and
a determination that the terminal device successfully sent the ring notification message to the core network within the second duration.

13. A terminal device comprises:
a transceiver, the transceiver configured to receive a call request message from a core network, wherein the call request message comprises a phone number of a calling device; and
at least one processor, the at least one processor configured to:
perform mobile terminated (MT) signaling interaction with the core network based on the call request message;
determine whether the MT signaling interaction succeeds within a preset duration; and
send prompt information responsive to a determination that the MT signaling interaction failed within the preset duration, wherein the prompt information indicate that the terminal device failed to answer an incoming call from the calling device, and wherein the prompt information comprises the phone number of the calling device.

14. The terminal device of claim 13, wherein:
the at least one processor is configured to display a missed incoming call notification in an user interface based on the phone number of the calling terminal.

15. The terminal device of claim 13, wherein:
the at least one processor is configured to determine that the MT signaling interaction failes based on a determination that the terminal device failed to send a ring notification message to the core network within the preset duration, wherein the ring notification message is used to instruct the core network to send a ring back tone to the calling device.

16. The terminal device of claim 13, wherein:
the at least one processor is configured to determine that the MT signaling interaction fails based on a determination that the terminal device received a hang-up notification message from the core network within the preset duration, wherein the hang-up notification message is used to instruct the at least one processor to interrupt the MT signaling interaction with the core network.

17. The terminal device of claim 16, wherein the preset duration comprises a first duration and a second duration, and the at least one processor is configured to determine that the MT signaling interaction fails responsive to a determination that:
the terminal device received the hang-up notification message within the first duration, and
the terminal device failed to receive another call request message within the second duration.

18. The terminal device of claim 16, wherein the hang-up notification message is a Session Initiation Protocol (SIP) exception message.

19. The terminal device of claim 16, wherein the hang-up notification message is a call disconnection message.

20. A non-transitory computer readable storage medium comprising instructions which, when executed by an electronic device, cause the electronic device to perform the following operations:
- receiving a call request message from a core network;
- performing mobile terminated (MT) signaling interaction with the core network based on the call request message, wherein the call request message comprises a phone number of a calling device;
- determining whether the MT signaling interaction succeeds within a preset duration; and
- sending prompt information to a user of the electronic device responsive to a determination that the MT signaling interaction failed within the preset duration, wherein the prompt information indicate that the electronic device fails to answer an incoming call from the calling device, and wherein the prompt information comprises the phone number of the calling device.

* * * * *